United States Patent
Martin et al.

(10) Patent No.: US 11,002,242 B2
(45) Date of Patent: May 11, 2021

(54) AXIAL-FLOW TURBINE FOR LOW-HEAD INSTALLATIONS

(71) Applicants: Joe Martin, Ontario (CA); Wagner A. Barbosa, Cerpch (BR); G Lucio Tiago Fiho, Cerpch (BR); Liuchen Chang, New Brunswick (CA); Jacek Swiderski, Ottawa (CA); Tony T. Tung, Ottawa (CA)

(72) Inventors: Joe Martin, Ontario (CA); Wagner A. Barbosa, Cerpch (BR); G Lucio Tiago Fiho, Cerpch (BR); Liuchen Chang, New Brunswick (CA); Jacek Swiderski, Ottawa (CA); Tony T. Tung, Ottawa (CA)

( * ) Notice: Subject to any disclaimer, the term of this patent is extended or adjusted under 35 U.S.C. 154(b) by 122 days.

(21) Appl. No.: 15/739,080

(22) PCT Filed: Jul. 21, 2015

(86) PCT No.: PCT/CA2015/050679
§ 371 (c)(1),
(2) Date: Dec. 21, 2017

(87) PCT Pub. No.: WO2017/011893
PCT Pub. Date: Jan. 26, 2017

(65) Prior Publication Data
US 2018/0195489 A1   Jul. 12, 2018

(51) Int. Cl.
*F03B 3/04* (2006.01)
*F03B 13/08* (2006.01)
(Continued)

(52) U.S. Cl.
CPC ............... *F03B 3/04* (2013.01); *F03B 3/12* (2013.01); *F03B 3/18* (2013.01); *F03B 13/08* (2013.01);
(Continued)

(58) Field of Classification Search
CPC ...... F03B 3/04; F03B 3/12; F03B 3/18; F03B 13/08; F03B 13/10; F03B 17/06;
(Continued)

(56) References Cited

U.S. PATENT DOCUMENTS

| | | | | |
|---|---|---|---|---|
| 3,986,787 A | * | 10/1976 | Mouton, Jr. ............ | F03B 11/02 415/7 |
| 4,279,539 A | * | 7/1981 | Gutierrez Atencio .... | E02B 8/06 290/53 |
| 4,421,990 A | * | 12/1983 | Heuss .................... | F03B 13/268 105/76 |
| 4,720,640 A | * | 1/1988 | Anderson ............. | F03B 13/083 290/43 |

(Continued)

FOREIGN PATENT DOCUMENTS

| EP | 2220365 A1 | 8/2010 |
|---|---|---|
| GB | 140004 A | 3/1920 |

OTHER PUBLICATIONS

International Search Report for International Application No. PCT/CA2015/050679, dated Jan. 21, 2016, 2 pages.

*Primary Examiner* — Michael Lebentritt
*Assistant Examiner* — Eric J Zamora Alvarez
(74) *Attorney, Agent, or Firm* — Stetina Brunda Garred and Brucker

(57) ABSTRACT

An axial flow turbine for generating electricity in low-head environments comprises a runner supported by guide vanes that are curved or contoured to direct flowing water onto fixed turbine blades. The axial flow turbine has a housing that provides an outer draft tube. A second inner draft tube is supported within the outer draft. The axial flow turbine may have a bulb or pit-type housing at the intake chamber for housing a direct-drive variable-speed permanent magnet synchronous generator (PMSG) and power converter system. The axial flow turbine may be installed as a single modular unit in low head environments.

16 Claims, 23 Drawing Sheets

(51) Int. Cl.
*F03B 13/12* (2006.01)
*F03B 3/18* (2006.01)
*F03B 13/10* (2006.01)
*F03B 3/12* (2006.01)

(52) U.S. Cl.
CPC ...... *F03B 13/10* (2013.01); *F05B 2220/7066* (2013.01); *F05B 2220/7068* (2013.01); *F05B 2260/96* (2013.01); *Y02E 10/20* (2013.01)

(58) Field of Classification Search
CPC .... F03B 17/061; F03B 13/105; F03B 13/083; F03B 13/264; F03B 13/268; F03B 15/14; F03B 7/00; F05B 2220/7066; F05B 2220/7068; F05B 2260/96; F05B 2240/133; F05B 2240/97; F05B 2210/16; Y02E 10/20
See application file for complete search history.

(56) References Cited

U.S. PATENT DOCUMENTS

| | | | |
|---|---|---|---|
| 4,764,083 A * | 8/1988 | Kawai | F03B 3/128 188/318 |
| 7,471,009 B2 * | 12/2008 | Davis | F03B 3/128 290/54 |
| 7,874,788 B2 * | 1/2011 | Stothers | F03B 3/04 415/4.5 |
| 8,426,990 B2 * | 4/2013 | Oswald | F03B 3/128 290/43 |
| 8,702,392 B2 * | 4/2014 | Kumano | F03B 7/00 416/119 |
| 9,000,604 B2 * | 4/2015 | Sireli | F03B 11/02 290/54 |
| 2007/0140829 A1 * | 6/2007 | Maillard De La Morandais | F03B 3/06 415/4.1 |
| 2015/0145259 A1 * | 5/2015 | Kehr | H02K 7/1823 290/54 |

* cited by examiner

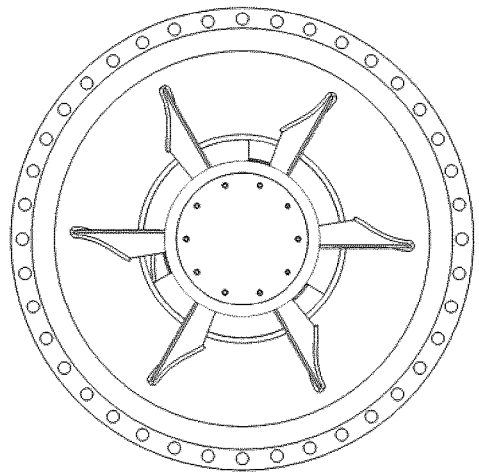
Figure 4A
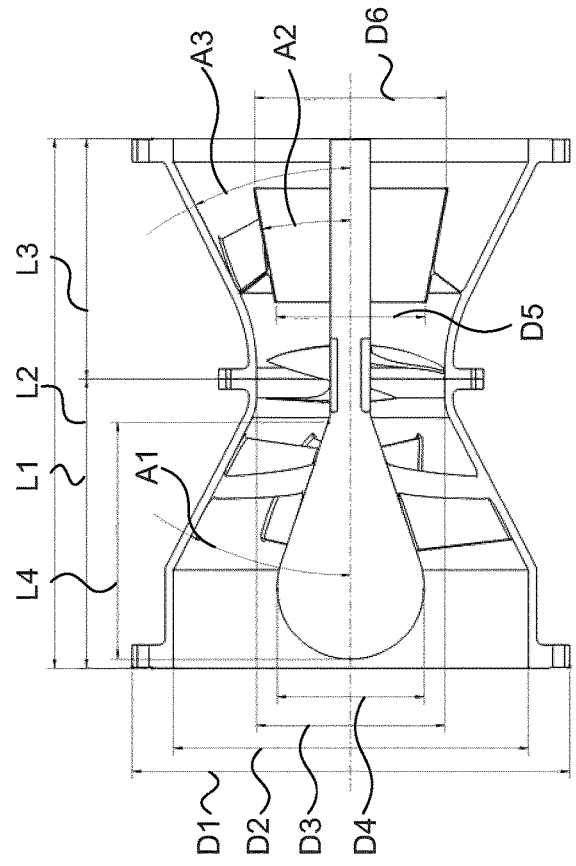
Figure 4B
Figure 4D
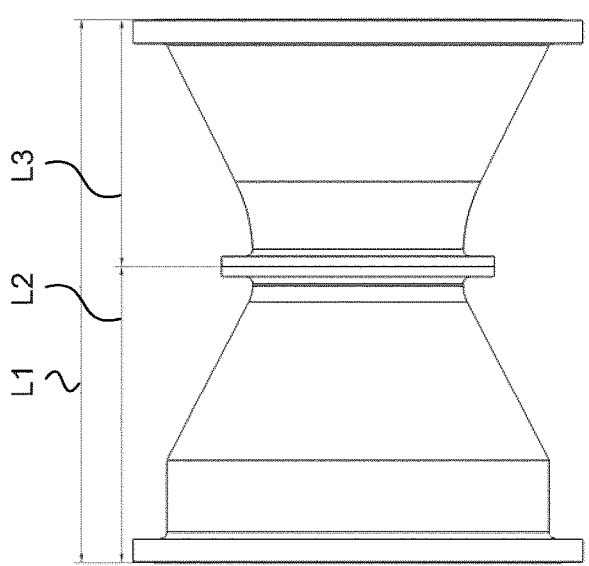
Figure 4C

CLASSICAL CONDITIONS

CLASSICAL CONDITIONS

AXIAL-FLOW TURBINE FOR LOW-HEAD INSTALLATIONS

CROSS-REFERENCE TO RELATED APPLICATIONS

The present application claims priority to PCT International Application No. PCT/CA2015/050679 filed on Jul. 21, 2015, the entirety of the disclosures of which are expressly incorporated herein by reference.

STATEMENT RE: FEDERALLY SPONSORED RESEARCH/DEVELOPMENT

Not Applicable

BACKGROUND

Technical Field

The current disclosure relates to axial-flow turbines for generating electricity, and in particular to axial-flow turbines for use in low-head installations.

Background

Hydro-electric generators utilize kinetic and/or potential energy from water to generate electricity. The energy may be related to a speed the water flows at and/or an amount of head available. The specific design of generators depend upon a number of factors; however, the dominating consideration may be the available head and/or a speed of the water flow.

Large head installations may generate large amounts of power. For example, hydroelectric stations along the Niagara River may generate a number of gigawatts of power. Such large generating capacity requires both a large amount of water as well as a large head. However, there are a limited number of sites at which such large scale hydro-electric generation are possible. Further, such large scale generation may require large infrastructure such as dams further limiting the ability to install new generation capabilities.

There are a large number of sites at which smaller-scale hydro-electric generation may be possible. For example, there are a large number of rivers or other flows that may have a low available head, such as a few feet or a few meters, but which may be suitable for small scale electricity generation. It is desirable to have an efficient generator suitable for use in low-head installations.

BRIEF SUMMARY

In accordance with the present disclosure there is provided an axial-flow turbine for low-head installations comprising a housing having an inlet and an outlet connected together by a flow chamber having a first diameter at the inlet, a second diameter smaller than the first diameter at an inner section and a third diameter at the outlet larger than the second diameter, wherein a transition of the housing from the second diameter to the third diameter provides an outer draft tube section of the flow chamber; an inner draft tube at least partially supported within the outer draft tube section of the flow chamber; a nose cone at least partially supported by a plurality of fixed-vanes within the flow chamber upstream of the inner draft tube; and a propeller turbine runner connected to the nose cone within the flow chamber.

BRIEF DESCRIPTION OF THE DRAWINGS

Features, aspects and advantages of the present disclosure will become better understood with regard to the following description and accompanying drawings in which:

FIGS. 4A-4D depict front, back, side and sectional views of components of a further turbine;

DETAILED DESCRIPTION

Small scale hydro electric turbine systems may be installed in low-head environments, or even in zero-head environments. The amount of energy that may be generated from such small-scale installations may be individually small; however there are a large number of locations where installation is possible and as such, the total energy that could be produced may be substantial. Since the energy produced at each individual location may be relatively low, the cost for installing and operating each location must also be low in order to have an economically feasible hydro-electric system. An axial-flow turbine is described further herein that may be useful for low-head, or zero-head, installations. The described turbine utilizes a pit-type turbine supported by stationary guide vanes to direct water flow to a propeller turbine runner and includes a double draft tube for providing a uniform, or at least more uniform, out flow. The described turbine with double draft tube can be manufactured and installed as a single modular unit in order to lower the associated civil works required for installation. Although the power generated by an individual turbine may be less than 150 kW, the low installation costs provide an economical mini-hydro electric system for use in low-head environments. Additionally, the low civil infrastructure required for installation may provide a more ecological foot print, allowing for installation of turbines in more locations.

The turbine and generator system use non-regulated axial-flow with fixed guide vanes and a fixed propeller runner. The elimination of wicket gates to control the flow simplifies the turbine design, manufacturing and maintenance. The stationary guide vanes and runner, having a relatively low number of runner blades such as 3, 4 or 5 runner blades, can provide a fish-friendly turbine that fish can pass through with relatively low mortality rates. The turbine and generator may use a permanent magnet generator (PMG) that is directly driven by the runner. The elimination of the gearbox simplifies manufacturing and maintenance as well as provides a lighter design. The turbine and generator includes a double-draft tube diffuser that minimizes cavitations and lowers civil installation costs since a traditional long draft tube does not need to be created in the installation. The turbine and generator provides a compact design that may be prefabricated as a single unit providing easy installation providing hydro-electric systems in locations with head ranges of less than, for example 3 meters.

Figure 1:
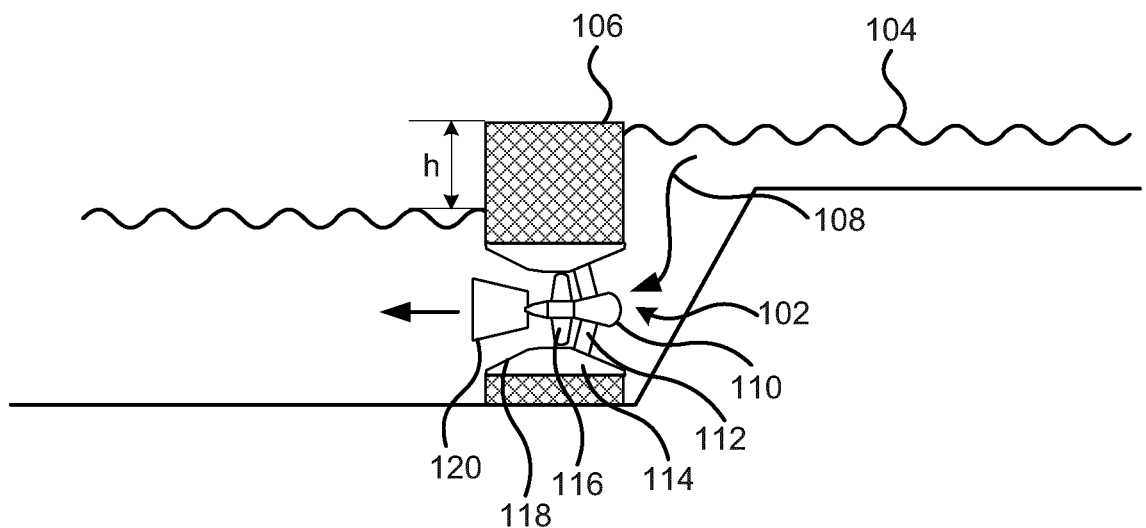
FIG. 1 depicts an installation of a turbine in a low-head environment.

FIG. 1 depicts an installation of a turbine in a low-head environment. The low-head hydro electric system 100 comprises an axial-flow turbine 102 that is installed within a water flow 104 such as a stream or river. The installation may include some infrastructure 106 placed within the water flow 104. The infrastructure 106 required will depend upon the particular site characteristics; however the infrastructure 106 provides a mounting location for the turbine 102 and may also provide a small dam or diversion to direct at least a portion of the water flow 104 through the turbine 102. The available head, h, in which the turbines may be suitably used may range from a few feet to a few meters. Embodiments of the turbine were designed, and some tests carried out, for a head of about 2.5 m. The turbine is also to be suitable for heads in the range of about 5 m or less.

The turbine 102 comprises a number of components that are located within a housing 114 that provides a flow chamber through which the water flows 108. A pit or bulb 110 is located within the turbine 102 and is supported by structural guide vanes 112. The pit or bulb assembly may house a generator and other power generation components. Alternatively, the generator and/or power generation components may located external from the bulb or pit 110. For example, the generator could be located externally from the flow chamber and be connected to a rotating member of the turbine via a drive belt or similar mechanism. A runner 116 may be rotatably connected to rotor of a generator located in the pit. The runner 116 comprises a number of fixed blades that are caused to rotate by the flow of the water. The structural guide vanes 112 are curved to guide the water onto the runner blade and increase the energy transfer efficiency. The structural guide vanes 112 create a hydraulic pre-vortex at the runner entrance. The housing 114 defines a draft tube section 118 that transitions from a small diameter in the vicinity of the runner assembly 116 to a larger diameter opening at the exit of the turbine. In addition to the draft tube section 118 of the housing 114, a second inner draft tube is located within the draft tube section 120. It is noted that support structures for supporting the inner draft tube are omitted in FIG. 1 for simplicity.

Figure 2A:
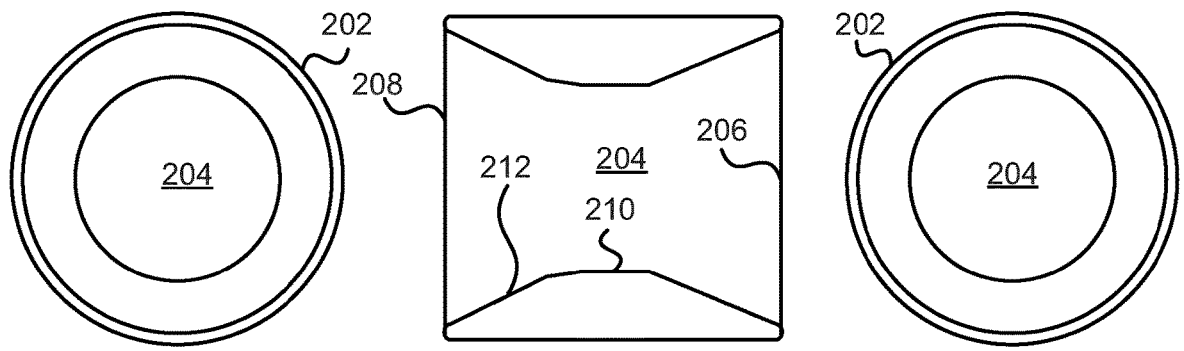
FIGS. 2A-2D depict back, side and front views of components of a turbine.

FIGS. 2A-2D depict back, side and front views of components of a turbine. FIG. 2A depicts only the outer housing 202. The housing 202 defines a flow chamber 204 between an inlet 206 and outlet 208. The flow chamber has a large diameter opening at the entrance, which narrows to a smaller diameter middle section 210. The housing 202 defines a draft tube section 212 that comprises a transition from the smaller diameter middle section 210 and a larger diameter outlet 208.

Figure 2B:
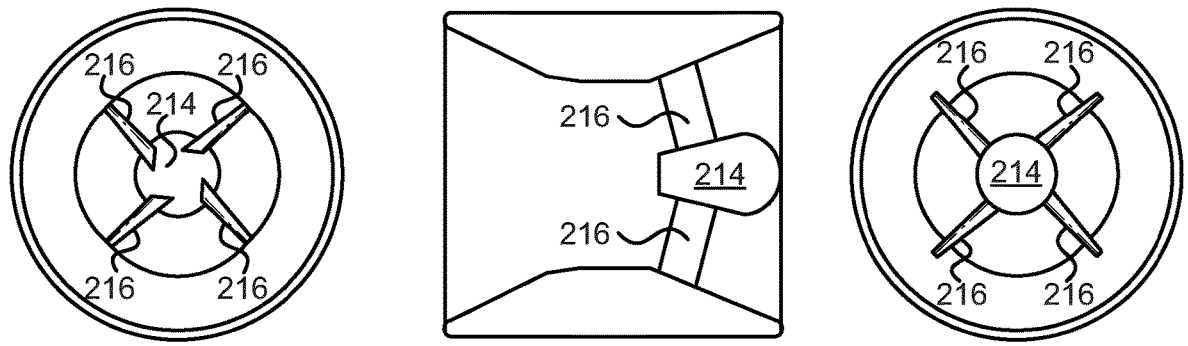

FIG. 2B depicts the stationary bulb or pit located within the housing 202. The bulb or pit 214 is located in the vicinity of the inlet 206 of the housing and may be sized to be able to enclose power generation equipment. The bulb or pit 214 is supported in the flow chamber by a number of structural guide vanes 216. Four structural guide vanes 216 are depicted, although other numbers are possible. For example, the bulb or pit 214 may be supported by six structural guide vanes 216. In addition to providing the structural support for the bulb or pit 214, the structural guide vanes are curved in order to impart a pre-vortex to the water flow as it enters the runner.

Figure 2C:
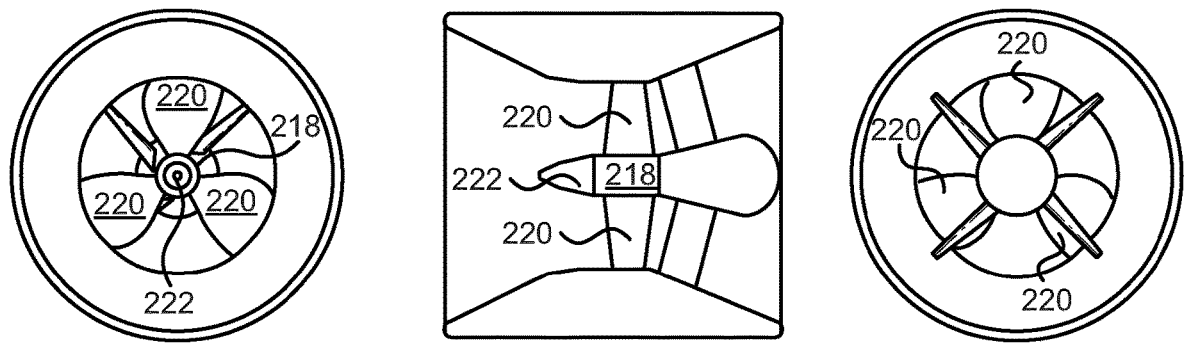

FIG. 2C depicts the rotating propeller turbine runner that is rotatably mounted to the bulb or pit 214. The runner 218 includes a plurality of blades 220 that are shaped to rotate the runner under the force of the water flow. The runner 218 depicted in FIG. 2C has three blades, however other number of blades may be used. The runner 218 may include a tail portion 222 that extends out rearward into, or at least towards the draft tube section 212.

Figure 2D:
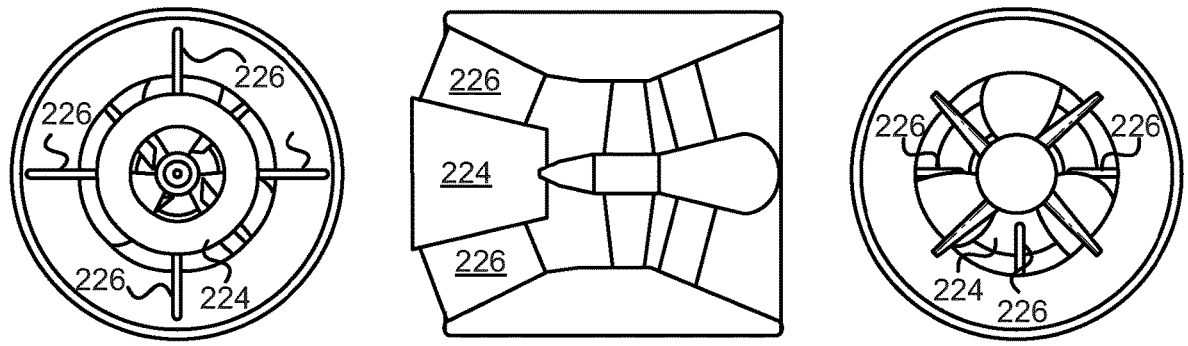

FIG. 2D depicts the inner draft tube that is mounted to the housing. The inner draft tube 224 is located within, or at least partially within, the draft tube section 212 of the housing providing a secondary draft tube within the housing, which may serve to reduce a length of draft tube required. Accordingly, the double draft tube allows the draft tube to be formed as part of the turbine unit, rather than as part of the civil works infrastructure of the installation. The inner draft tube 224 is supported by a number of supports 226 connected to the housing. Four supports 226 are depicted although other numbers of supports are possible. Further, in contrast to the structural guide vanes supporting the bulb, which are shaped to guide the water flow, the supports 226 do not need to impart any movement to the water flow, and as such may be straight.

Figure 3:
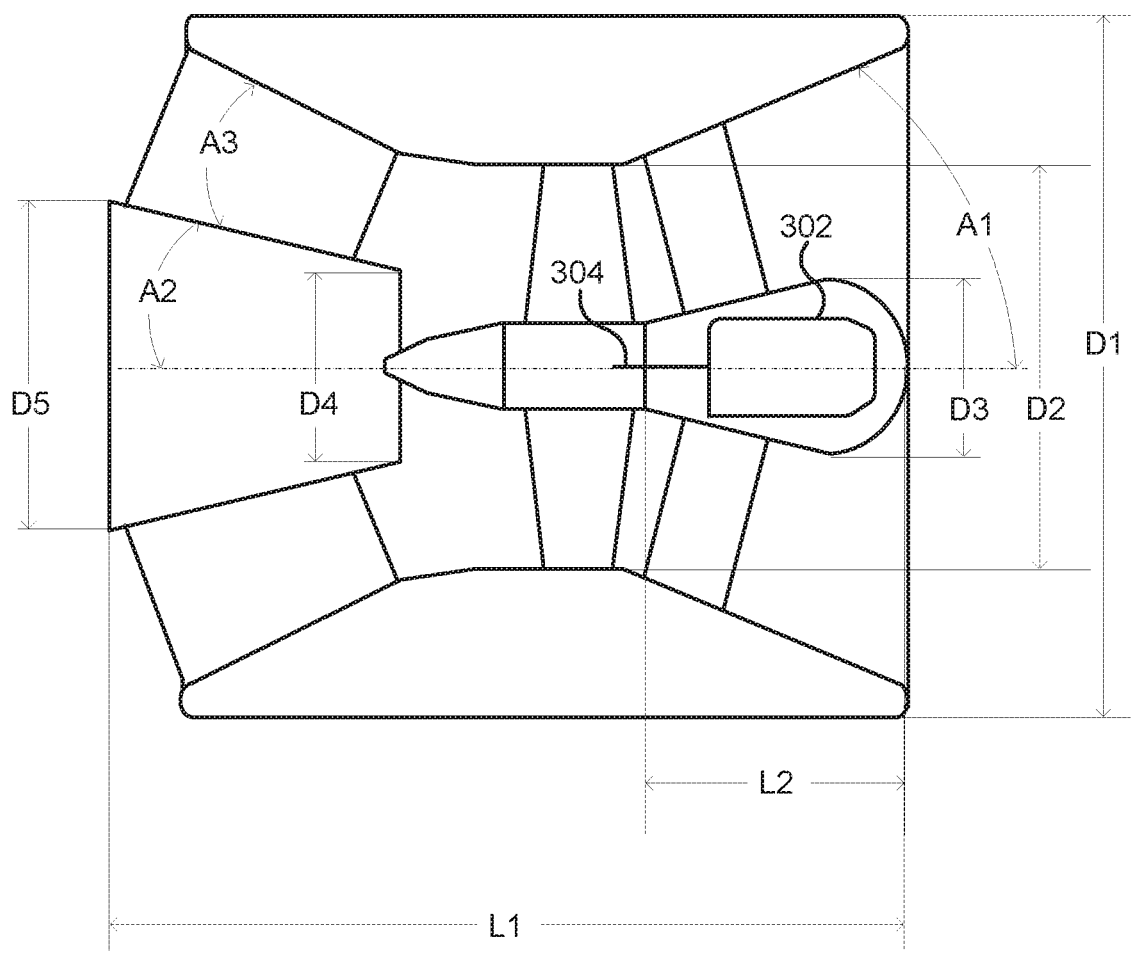
FIG. 3 depicts a cross section of a turbine and generator.

FIG. 3 depicts a cross section of a turbine and generator. The turbine depicted is substantially the same as that depicted in FIG. 2D and as such the same components are not labeled for simplicity and clarity of the drawing. The generator 302 is depicted within the bulb in FIG. 3. As depicted, the generator 302 is located within the stationary bulb and connected to the rotating runner by a connecting shaft 304 such that rotation of the runner causes a rotation of the rotor of the generator. The generator 302 may be directly connected to the runner such that the revolutions per minute (RPM) of the runner is equal to RPM of the generator. FIG. 3 labels a number of relevant measurements of an illustrative embodiment. It will be appreciated that the particular measurements may vary. Further the scale of the turbine may vary. Illustrative values for the measurements are shown in Table 1.

TABLE 1

Table showing measurements of components of FIG. 3

| Measurement | Value |
|---|---|
| D1 | 677 mm |
| D2 | 360 mm |
| D3 | 281 mm |
| D4 | 285 mm |
| D5 | 367 mm |
| L1 | 1013 mm |
| L2 | 452 mm |
| A1 | 27 degrees |
| A2 | 11 degrees |
| A3 | 16 degrees |

FIGS. 4A-4D depict front, back, side and sectional views of components of a further turbine. The turbine incorporates the features and functionality described above; however, the design has been modified to incorporate 6 stay vanes for supporting the runner and controlling the flow of water to the runner blades. Illustrative measurements of the turbine of FIGS. 4A-4D are provided in Table 2.

TABLE 2

Table showing measurements of components of FIG. 4A-4D

| Measurement | Value |
|---|---|
| D1 | 837 mm |
| D2 | 679 mm |
| D3 | 360 mm |
| D4 | 281 mm |
| D5 | 285 mm |
| D6 | 367 mm |
| L1 | 1013 mm |
| L2 | 552 mm |
| L3 | 461 mm |
| L4 | 452 mm |
| A1 | 27 degrees |
| A2 | 11 degrees |
| A3 | 27 degrees |

The structural design of the turbine was modeled, tested and refined using flow analysis software. The numerical model of the turbine included all water flow passages, starting from the inlet canal through the turbine intake including the stay vanes, three-bladed runner, dual-passage draft tube with inner cone supported by four profiled supporting vanes. Four stay vanes were initially modeled as depicted in FIGS. 2A-2D; however, the design was revised to incorporate six stay vanes.

The turbine model was analyzed in various conditions, including in a low-head dam configuration, a free-stream configuration and an in-penstock configuration. The design was refined using a multi-objective optimization process, which attempts to optimize the design for a number of objectives. The design was optimized for:

Maximization of energy efficiency and in particular the turbine's hydraulic efficiency in order to produce the greatest amount of energy.

Maximization of turbine speed in order to utilize the smallest generator size possible.

Maximization of turbine unit flow in order to provide the smallest possible turbine size.

Minimization of a volume of the fish-mortal local strain in which fish will die.

Minimization of a volume of the fish-mortal local shear stress in which will die.

Figure 5A:
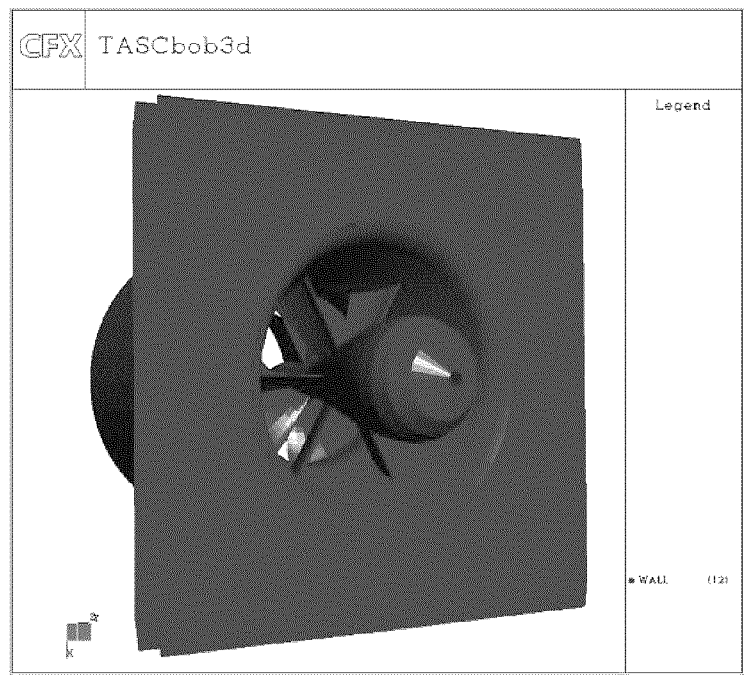
FIGS. 5A and 5B depict a turbine model in a low-head dam configuration.
Figure 5B:
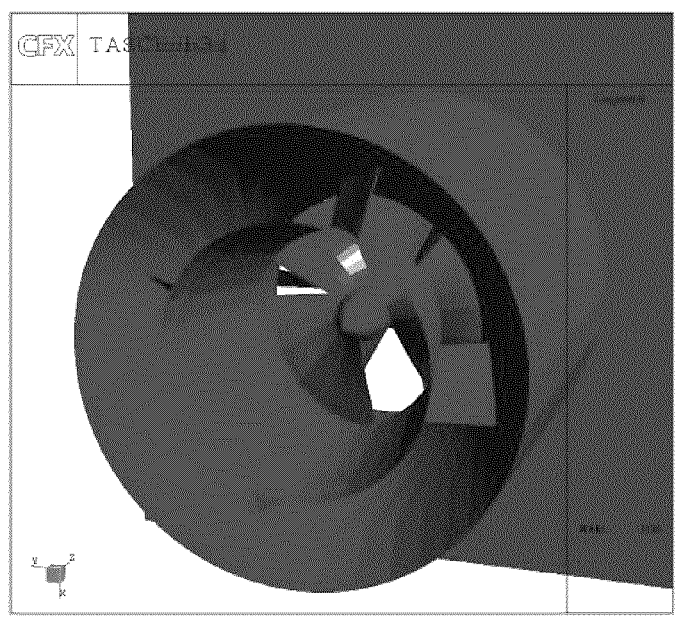
Figure 6A:
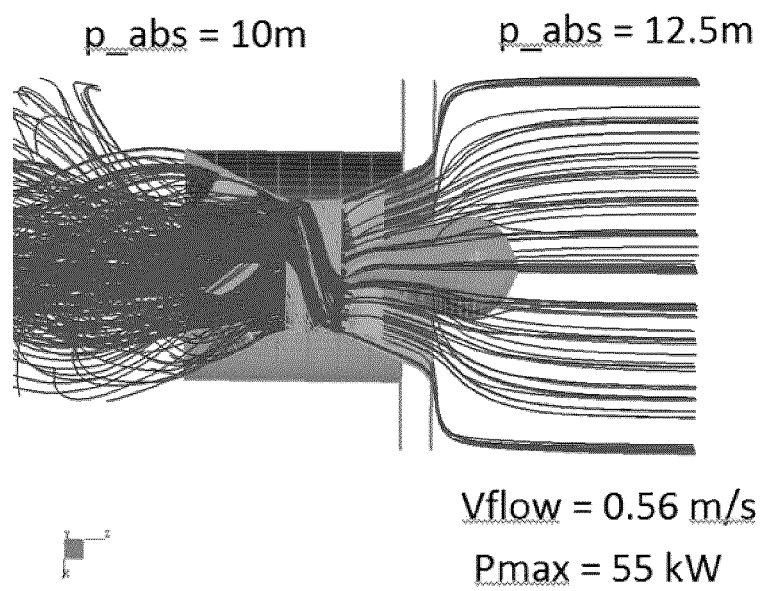
FIGS. 6A and 6B depict simulation test results of the low-head dam configuration.
Figure 6B:
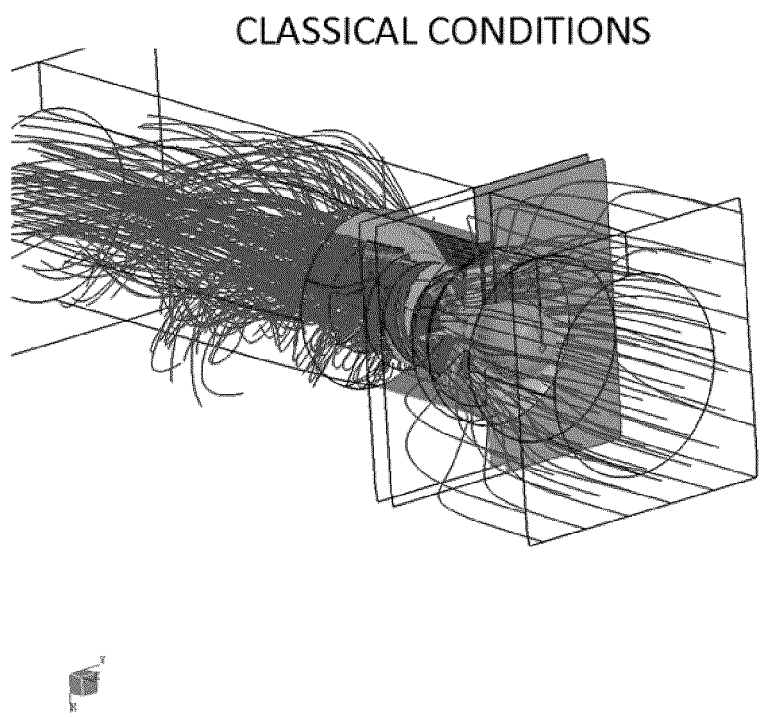

The turbine model was tested in a low-head dam configuration as depicted in FIGS. 5A and 5B. The results of the analysis are depicted in FIGS. 6A and 6B. The analysis confirmed the target operating parameters.

Figure 7:
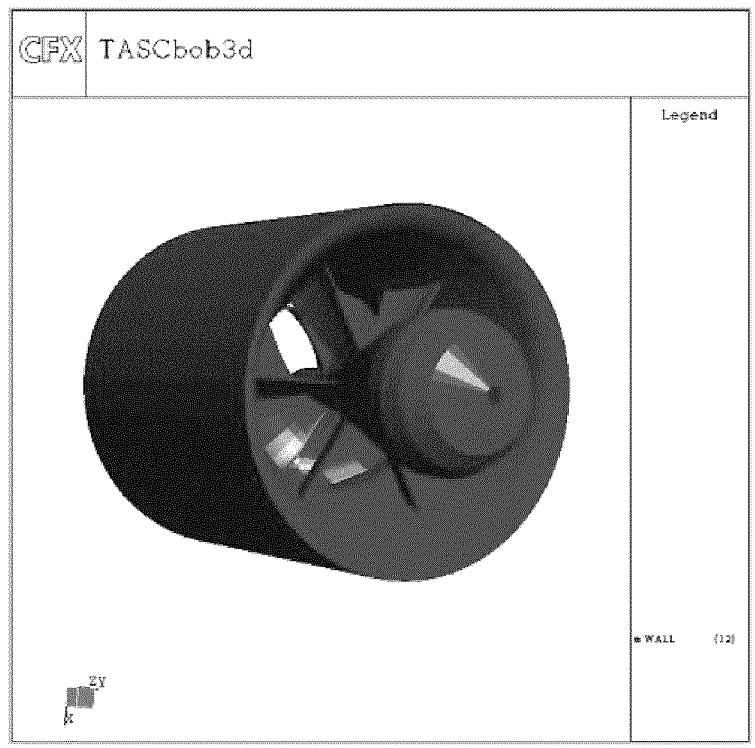
FIG. 7 depict a turbine model in a free-stream configuration.
Figure 8C:
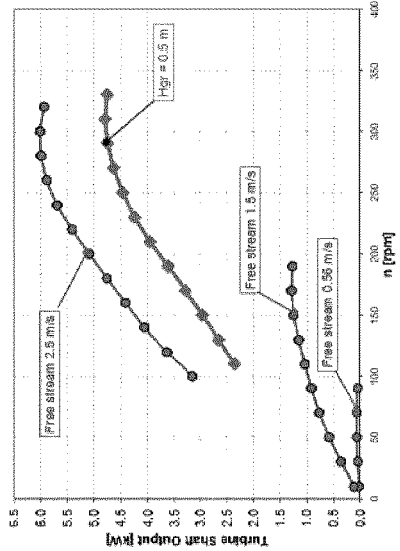
FIGS. 8A-8D depict simulation test results of the free-stream configuration.
Figure 8D:
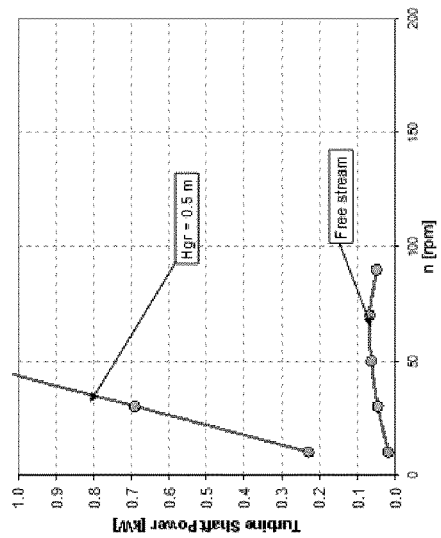
Figure 8A:
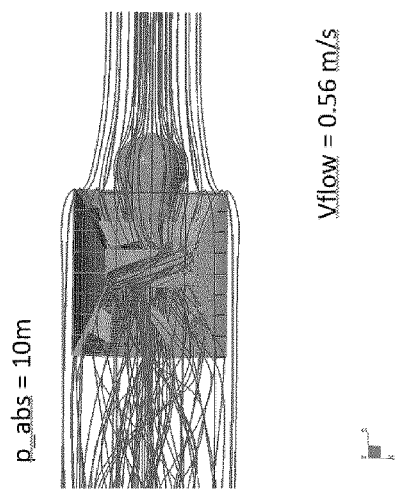
Figure 8B:
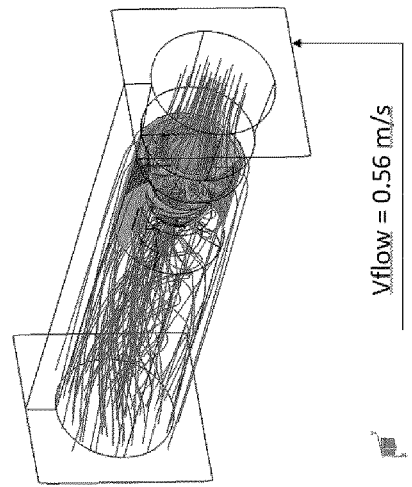

The turbine model was also tested in a free-stream configuration analysis. The free-stream configuration is depicted in FIG. 7 and the results in FIGS. 8A, 8B, 8C and 8D. Based on the analysis, the turbine performance appears to depends strongly on the velocity of the stream. However, the flow appears to have a tendency to by-pass the turbine, leaving minimal flow passing through. Accordingly, in order to provide desirable power generation in a flow-flowing stream a bell mouthed intake may be used. The bell-mouth intake may provide an intake that is approximate 4 to 6 times enlarged in order to provide results somewhat comparable to a low-head dam configuration with a head of 1 to 2 meters.

Figure 9A:
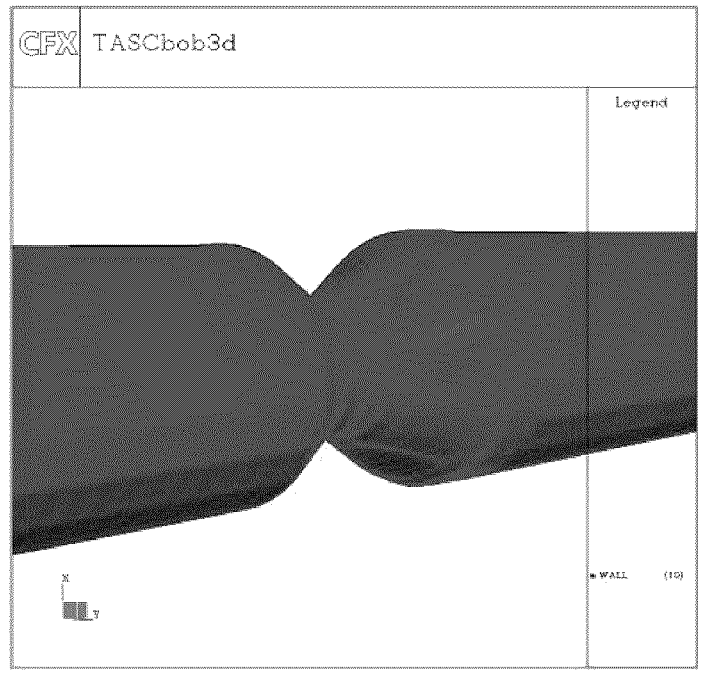
FIGS. 9A and 9B depict a turbine model in an in-penstock configuration.
Figure 9B:
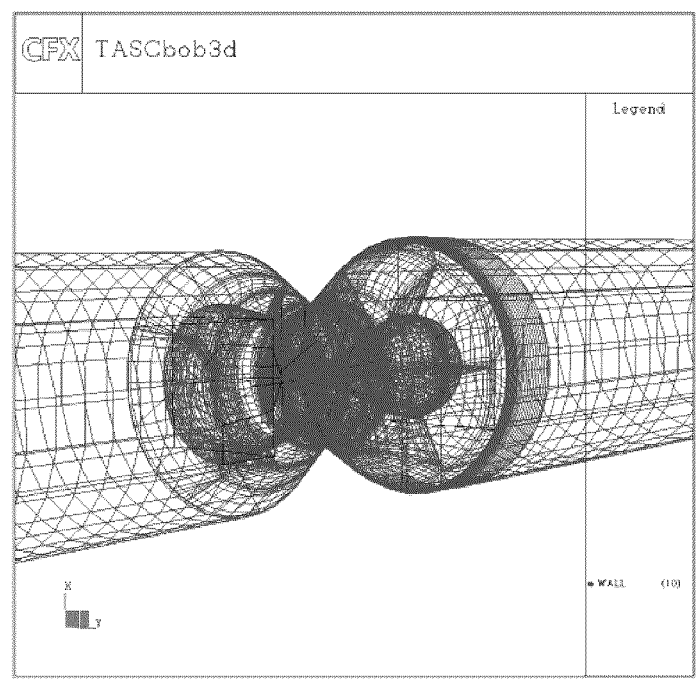
Figure 10A:
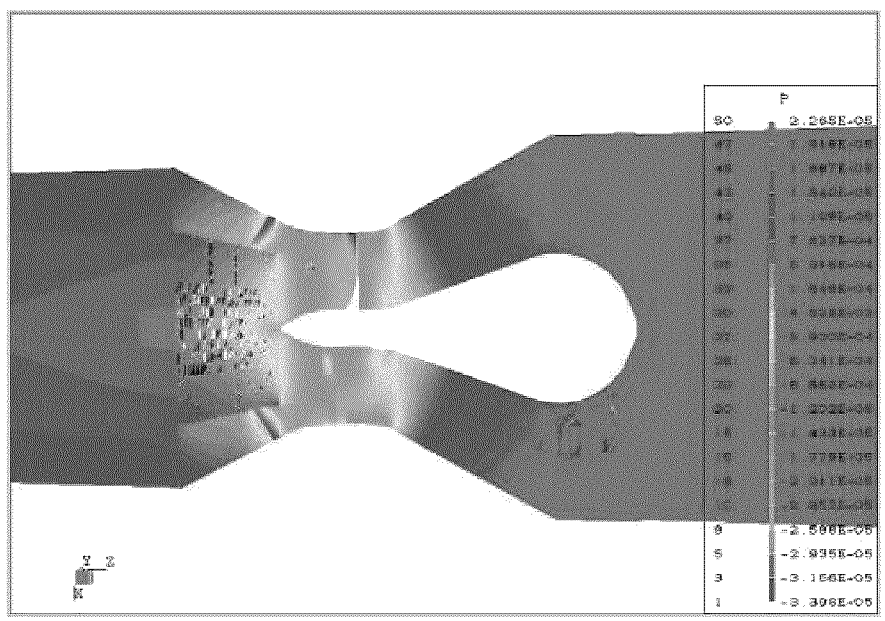
FIGS. 10A and 10B depict simulation test results of the free-stream configuration.
Figure 10B:
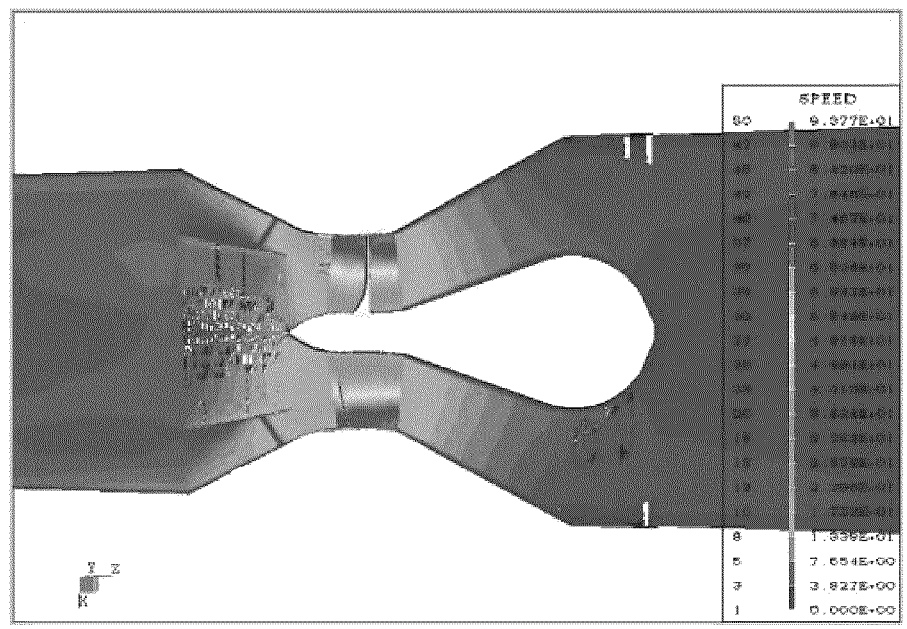

The model was also analyzed in an in-penstock configuration which corresponds to a laboratory setup used for testing. Accordingly, the in-penstock configuration was analyzed to establish a comparison baseline as well as how to extrapolate the in-penstock laboratory test results to the low-head dam configuration which is intended to be used. The in-penstock configuration is depicted in FIGS. 9A and 9B and the results depicted in FIGS. 10A and 10B.

Figure 11A:
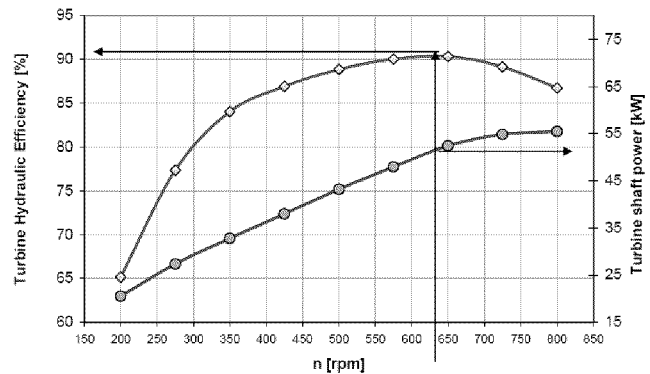
FIGS. 11A-11C depict simulation test results of a fine-grid model of the turbine.
Figure 11B:
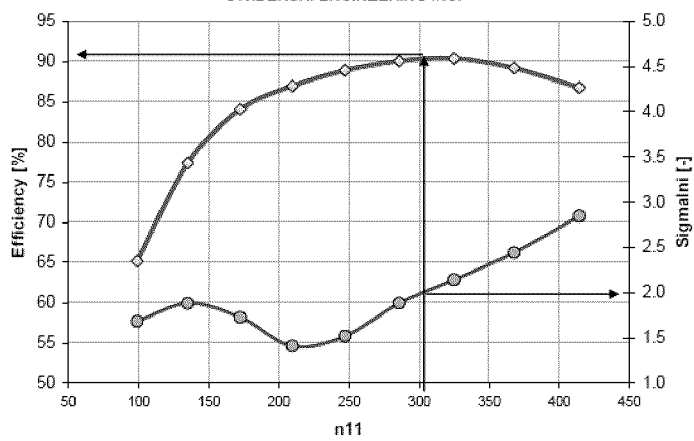
Figure 11C:
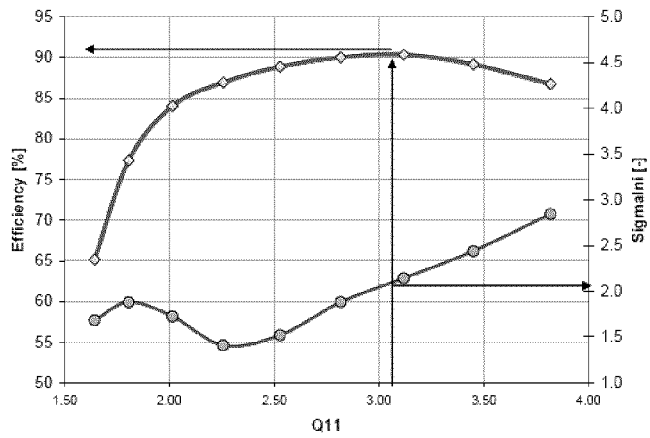
Figure 12C:
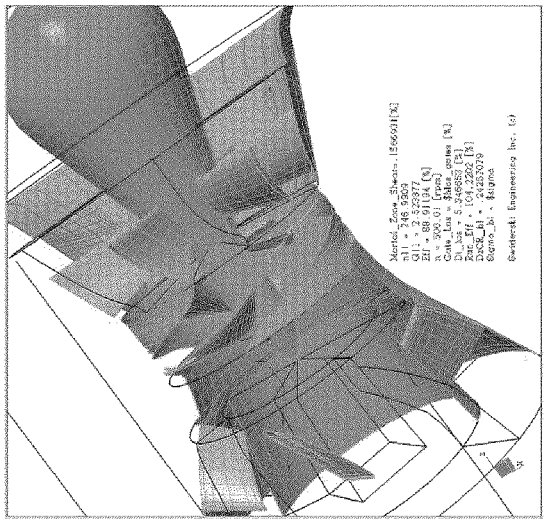
FIGS. 12A-12D depict simulation results of fish mortality test for different turbine RPMs.
Figure 12D:
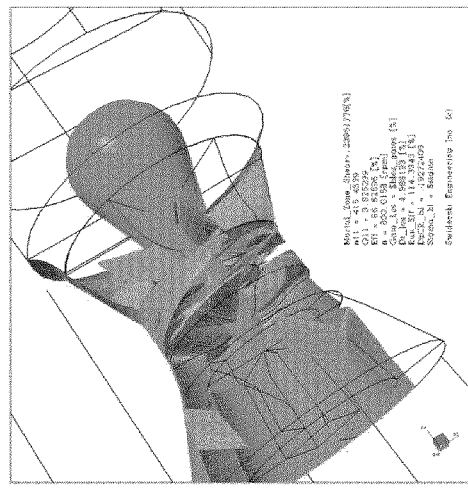
Figure 12A:
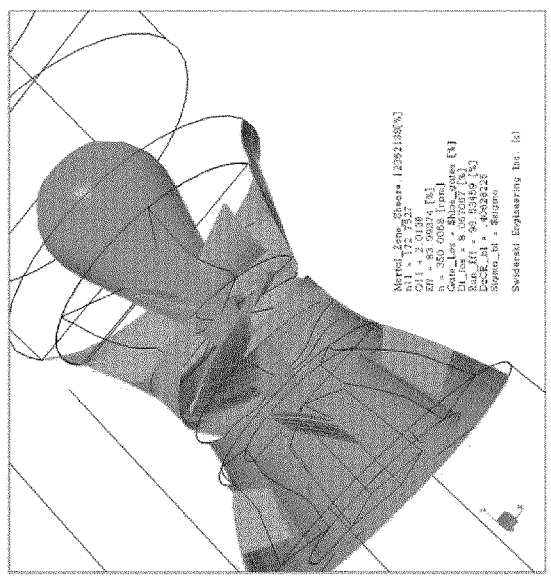
Figure 12B:
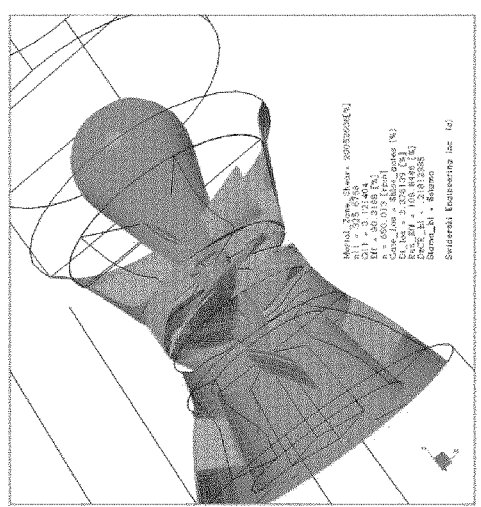

Once the optimization process was completed, a fine-grid model was tested, the results of which are depicted in FIGS. 11A, 11B and 11C. It is noted that the results depicted do not account for energy losses in the bearing system or in the generator.

Based on the analysis performed, cavitation exposure, represented by the Thoma number (Sigma=(Hb−Hv−Hs)/Hnet)) where Hb is atmospheric pressure, Hv is vapour pressure, Hs is the turbine setting and Hnet is the net head, indicates a large safety margin for the intended installation of the turbine. As the turbine setting will be below the tailrace, under assumed extreme operating conditions of 800 RPM, there will be approximately 2.2 m protection head against cavitation. Lower operating speeds will provide an even higher safety margin.

In order to determine potentially mortal zones for fish, the pressure rate change and the shear stress were analyzed. A fish mortality factor (FMF) was minimized. The FMF was defined as a ratio between a mortal volume and the total volume of flow passages. The mortal volume is the volume where shear stress or strain rate due to pressure rate changes are above what is considered mortal to fish. The results are depicted in FIGS. 12A, 12B, 12C and 12D.

Figure 13:
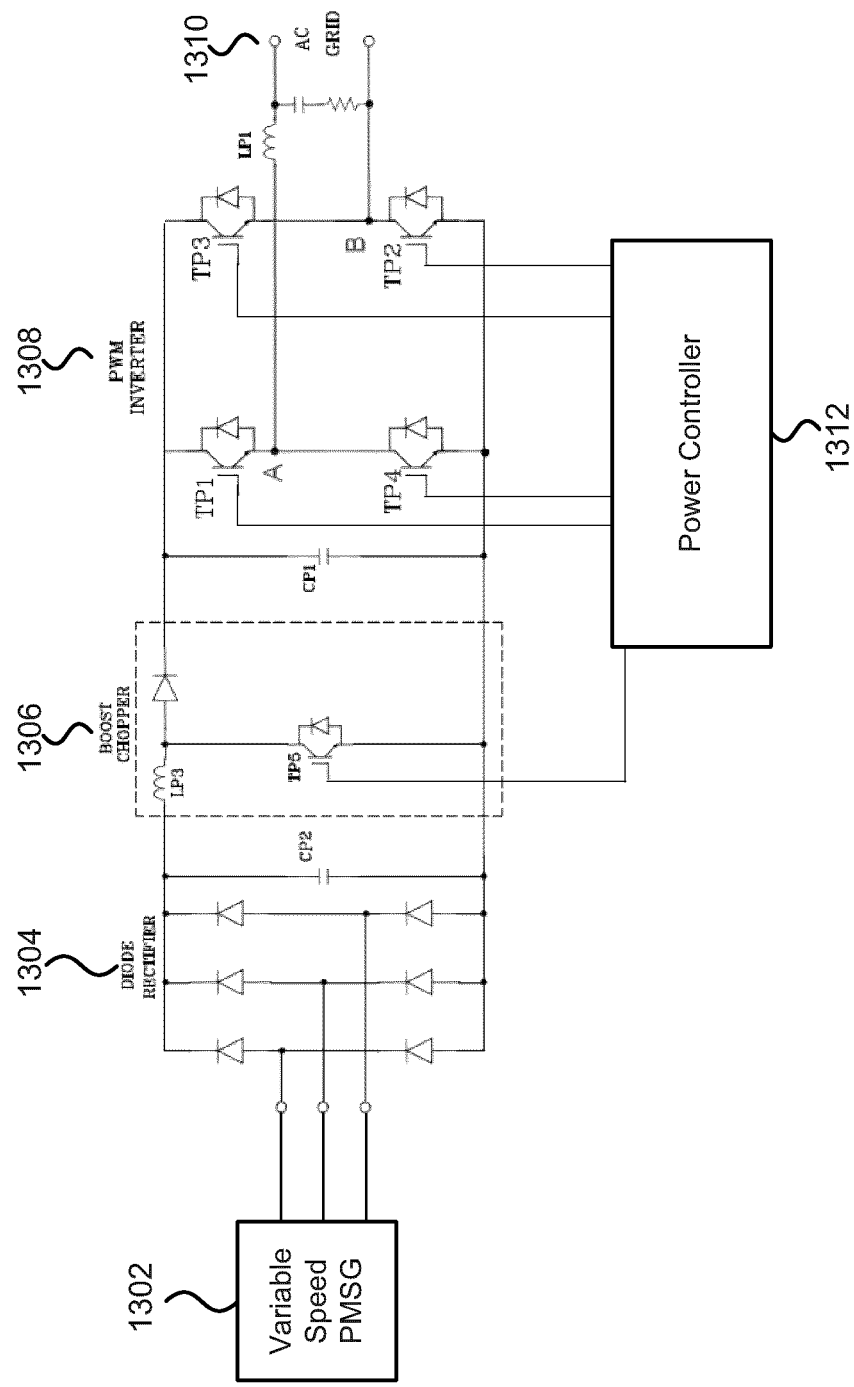
FIG. 13 depicts components of the power generation system.

FIG. 13 depicts components of the power generation system. The components include a permanent magnet synchronous generator (PMSG) 1302. The PMSG may be directly driven by the rotating runner of the turbine and as such may operate at variable speeds. The PMSG may have three phases. Although the particular specifications may vary, in one embodiment, the PMSG had a rated power of 11 kW, a rated speed of 1730 RPM and a rated voltage of 280-300 V AC three-phase. The power produced by the PMSG 1302 is converted by a converter into a signal suitable for injection into a power grid. The power converter comprise a diode rectifier 1304 that produces a DC signal from the alternating current signal generated by the PMSG. A DC/DC boost chopper 1306 raises the DC voltage and a PWM inverter 1308 generates an AC signal suitable for injection into the power grid 1310. Both the boost chopper 1306 and the PWM inverter may be controlled by a power controller 1312 that controls the operation based on various control algorithms. The power controller 1312 may control operating parameters such as switching frequencies so that the inverter operates efficiently based on the operating conditions of the PMSG. Further the controller 1312 may control operating characteristics of the PMSG in order to control the operating conditions, such as a rotational speed of the runner. Such control may allow control of a flow rate of the water passing through the turbine. By changing a flow rate of the water passing through the turbine, a height of water behind the turbine may be controlled.

The power controller 1312 may use a golden section search (GSS) based maximum power point tracking (MPPT) method under un-regulated water flow conditions. A variable switching frequency pulse-width-modulation (PWM) strategy may also be used to improve the efficiency of the power converter while meeting the grid power quality requirements. Further, the controller may provide a grid interconnection system compliant with international standards for distributed generation, such as fault ride through, island detection etc. Further, the controller may provide fault diagnosis technology for power semiconductor devices and dc link capacitors based on signal processing of converter voltages and currents.

Figure 14:
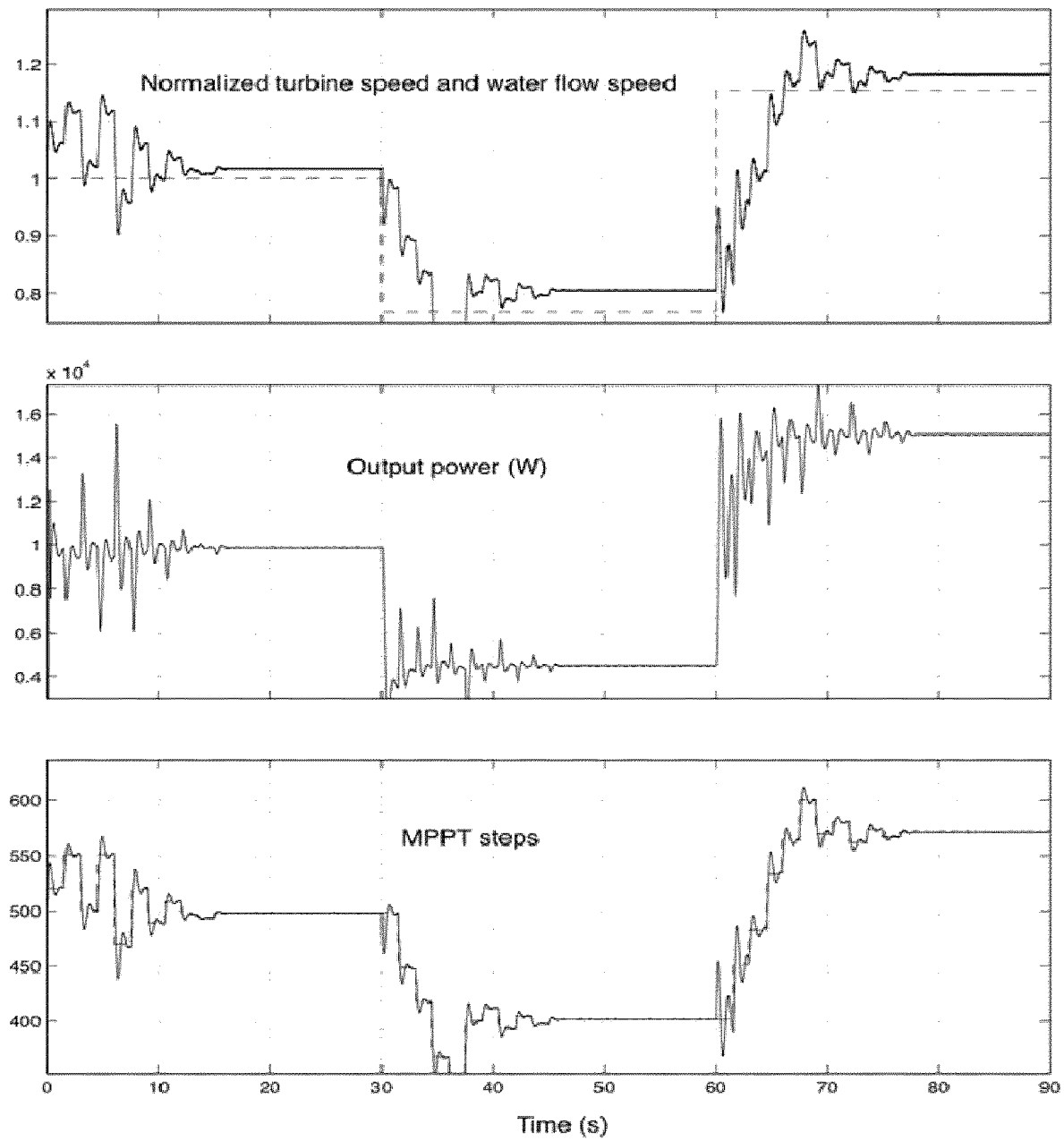
FIG. 14 depicts simulation results for the GSS-based MPPT algorithm

MPPT is beneficial in a water turbine power converter when it is desirable to harvest the maximum hydro power at different turbine operation conditions, such as various water flow speeds, and various turbine rotating speeds. The MPPT algorithm may be based on a golden section search (GSS) method. The GSS is a technique for locating the extremum of a unimodal function inside a bracketing interval by repeatedly narrowing the width of the interval. The searching for the extremum is an iterative procedure. For each iteration, the value of a certain point inside the current search section is evaluated in order to determine a narrowed section from two possible selections for the next iteration. As a result, after some iterations the searching process will be guaranteed to converge to a very small area where the extremum is located. When the section narrowing ratio for each iteration is set to the number of golden ratio, the converge is optimal with a constant speed. Compared to the conventional MPPTs, e.g. the power curve look-up table method, hill climbing method, etc., the GSS-based MPPT may provide improvements in terms of search efficiency and search speed for locating the optimal operating characteristics. FIGS. 14 depicts simulation results for the GSS-based MPPT algorithm.

An optimal switching frequency for grid-connected power converters may be important for both the efficiency of power conversion and the power quality fed to the grid. On one hand, a higher switching frequency increases switching losses that are major losses during the power conversion, therefore reduces the efficiency. On the other hand, a lower switching frequency results in worse power quality, in particular a higher current harmonic distortion. Thus, the selection of the switching frequency is usually considered as a tradeoff between reducing the switching losses and achieving an optimal current harmonic performance. A variable switching frequency control (VSFC) algorithm may be used to improve the total efficiency of single-phase grid-connected power converters through operating the inverter at optimal switching frequencies under different working conditions.

Traditionally, a given fixed switching frequency is applied to converters according to design requirement, control algorithm development and loss consideration. However, a fixed switching frequency cannot be optimal for all operations due to parameter variations. In this converter, the mathematical models for the converter efficiency and the current distortion estimation are first generated. And then the optimal switching frequency is calculated on the fly based on the models at different operation conditions. This VSFC ensures that the total harmonic distortion (THD) of the current fed to the grid complies with the requirement of standards and that the total efficiency of the converter improves significantly through utilizing optimal switching frequencies.

Figure 15:
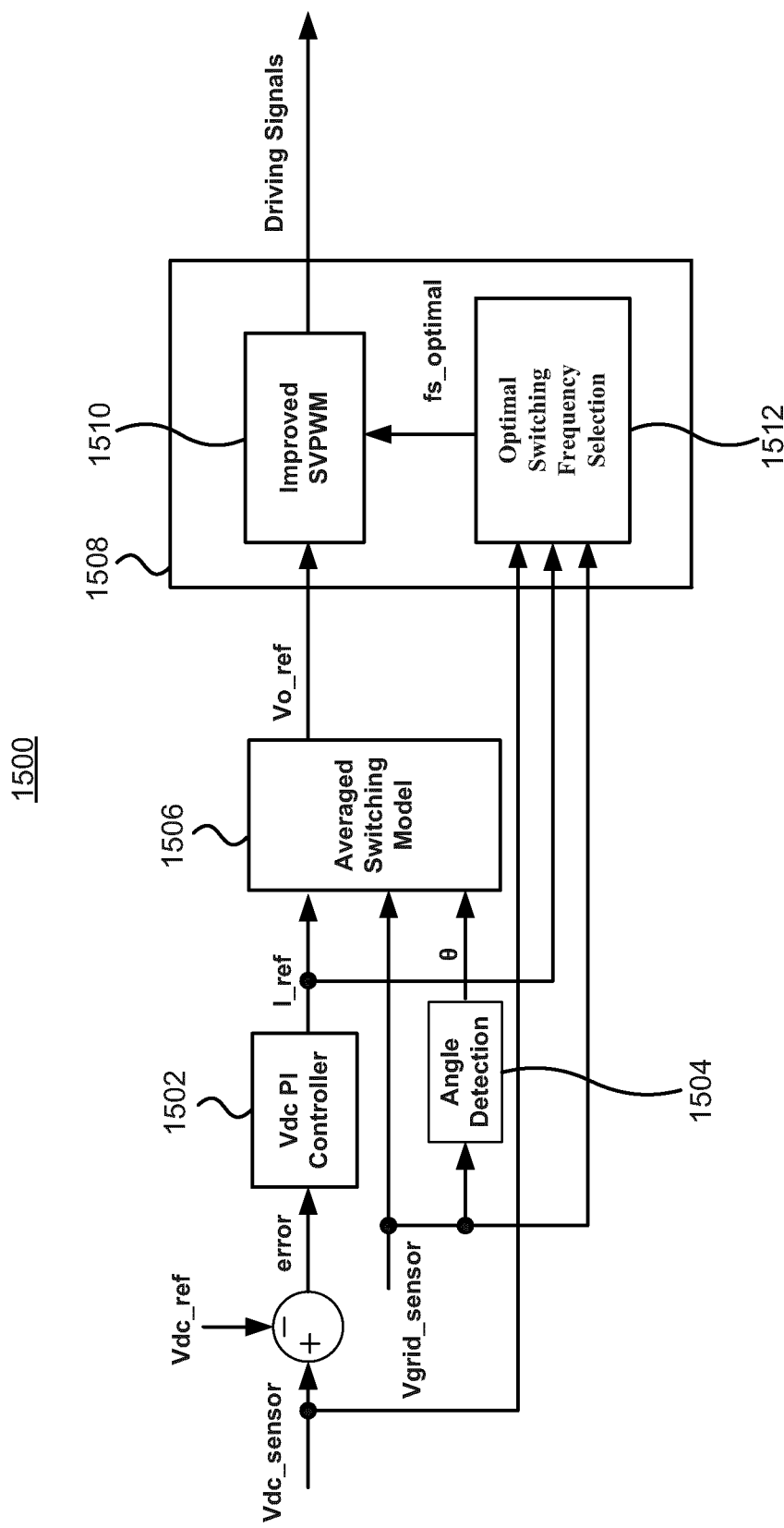
FIG. 15 shows a control diagram for a variable switching frequency PWM.

FIG. 15 shows a control diagram for a variable switching frequency PWM. The variable switching frequency PWM control may be implemented in, for example, the power controller 1312. The variable switching frequency PWM control 1500 comprises a Vdc PI controller 1502, angle detection functionality 1504, an averaged switching model 1506 and frequency controller functionality 1508 for providing driving signals. The frequency controller comprises Space Vector Pulse Width Modulation (SVPWM) functionality 1510 and frequency selection functionality 1512.

The digital control system designed for the variable switching frequency control (VSFC) with the improved Current Controlled Space Vector Pulse Width Modulation (CCSVPWM) includes an outer loop of the dc-link voltage regulation, an inner loop of the predictive current control and the improved SVPWM technique based on the optimal switching frequency.

In order to balance the power flow through the system, the $V_{dc}$ PI controller is implemented to yield the amplitude of the reference current $I_{ref}$ for the full-bridge inverter by monitoring the voltage difference between the average of dc-link voltage measurement ($\overline{V}_{dc}$) and a constant preset reference value ($V_{dc}^*$). However, a predicted dc-link voltage ($\widetilde{V}_{dc}$) may be introduced for an actual real-time system due to the implementation of sampling techniques and thus the $V_{dc}$ PI controller can be expressed in discrete-time format as $$\begin{cases} \hat{V}_{dc}(K+1) = 2\overline{V}_{dc}(K) - \overline{V}_{dc}(K-1) \\ \hat{V}_g(K+1) = V_g(k) \\ I_{ref}(K+1) = I_{ref}(K) + K_p[E_{dc}(K+1) - E_{dc}(K)] + K_i T_0 E_{dc}(K+1) \end{cases} \quad (1)$$

where $E_{dc}(K) = V_{dc}^*(K) - \overline{V}_{dc}(K-1)$, $T_o$ is the sampling time which equals to the grid period; $K_p$ and $K_i$ are parameters of the PI controller.

The predictive current controller 1506 is developed from a typical deadbeat control scheme based on the averaged switch model of voltage source inverters (VSIs). Due to the time-delay effect produced in an actual system by sampling and DSP calculation, the proposed predictive current controller provide the compensation through forecasting the forthcoming values of system variables, which can be described in discrete-time format by:

$$v_{ab}^*(K+1) = L\frac{i_g^*(K+1) - \hat{i}_g(K)}{T_s} + \hat{v}_g(K+1) \quad (2)$$

Figure 16:
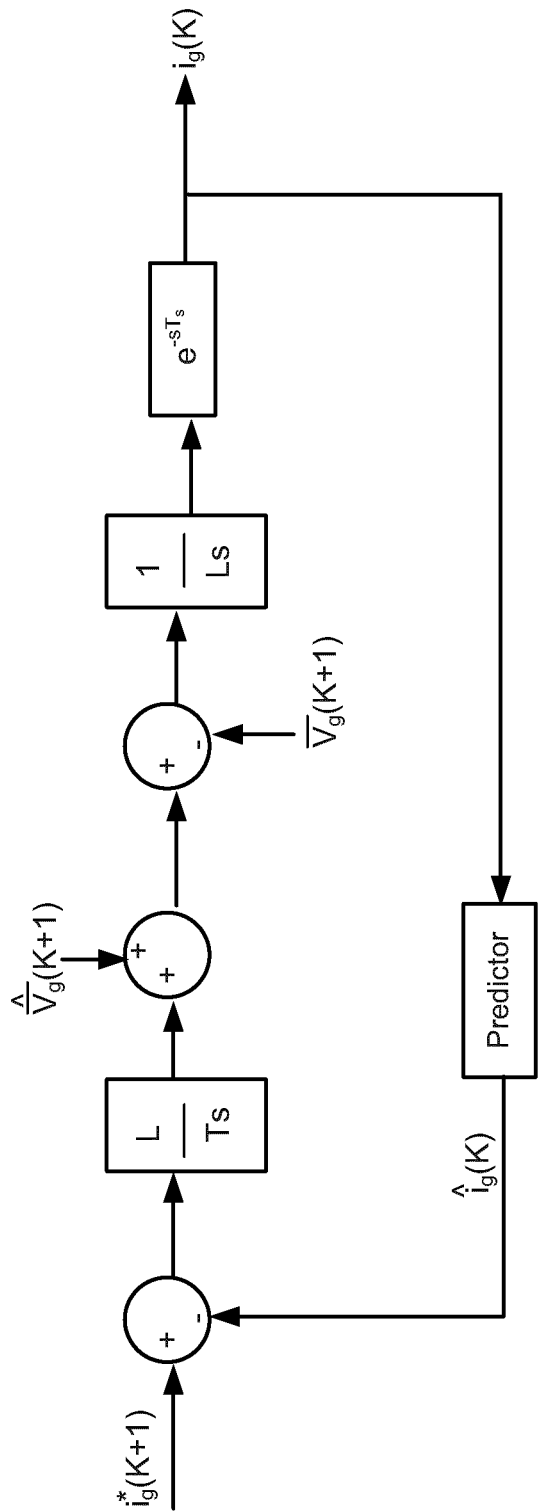
FIG. 16 depicts a predictive current controller.

FIG. 16 depicts the predictive current controller. The predictive current controller is presented based on a simple linear estimation method.

The choice of switching frequency is a key consideration for grid-connected VSIs both to achieve high efficiency operation and to satisfy the requirement of grid interconnection standards related to power quality. In order to achieve a maximum efficiency operation, the inverter works with a set of optimal switching frequencies, which are selected based on various operation conditions and limited by an estimation model of current total harmonic distortion (THD). Thus, the optimal switching frequencies of VSIs can be obtained from $$f_{s\_optimal} = \min_{THD_{Req}} f_{s\_THD}(THD_{Req}) \quad (3)$$

$$= \frac{1}{3\% \cdot 24\sqrt{2}\, \pi^2 L V_{dc} I_{ref}} \cdot$$

$$[36\pi^4 V_g^4 + 72\pi^4 V_g^2 (L\omega_0 I_{ref})^2 +$$

$$36\pi^4 (L\omega_0 I_{ref})^4 + (24\pi^4 - 576)V_{dc}^2 V_g^2 +$$

$$24\pi^4 V_{dc}^2 (L\omega_0 I_{ref})^2 + 748.8\sqrt{2}\, V_{dc}^3 V_g -$$

$$486.72 V_{dc}^4 - 128\sqrt{2}\, \pi^3 V_{dc} V_g^3 -$$

$$192\sqrt{2}\, \pi^3 V_{dc} V_g (L\omega_0 I_{ref})^2 ]^{\frac{1}{2}}$$

where 3% is a pre-set THD requirement value to keep the sufficient margins for control. Based on the optimal switching frequencies, the driving signals may be generated.

Figure 17:
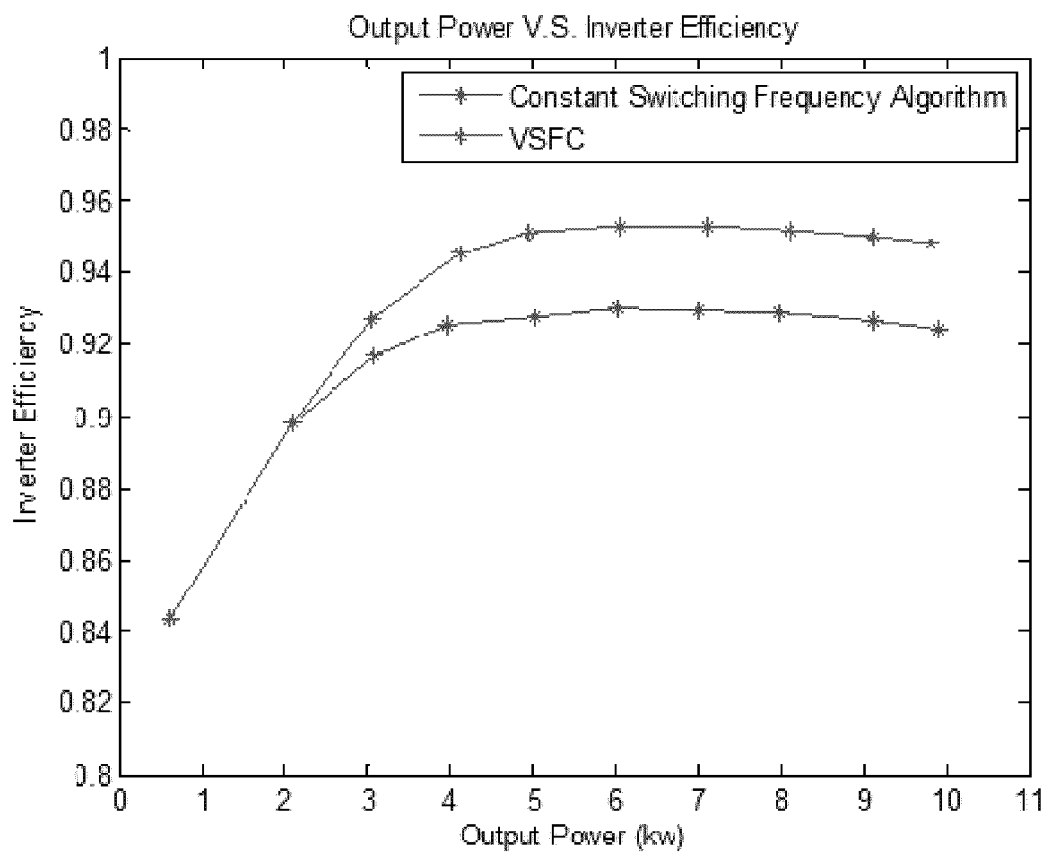
FIG. 17 shows the efficiency improvement with the VSFC algorithm.

FIG. 17 shows the efficiency improvement with the VSFC algorithm as compared to a typical PWM method with a constant switching frequency.

As a grid interconnection system, the power converter has to comply with standards relevant to the performance, operation and safety of the interconnection of distributed resources with electric power systems. The standards, which may be for example UL-1741, CSA C22.2 No. 107.1, and IEEE-1547, specify the compliance requirements for the grid-connected power converters to operate with distributed generations. The converter may implement the features required for compliance including for example anti-islanding detection algorithm and various protections for abnormal voltage, current and frequency to assure the operation and safety compliance with the standards. The power converter may also provide a current control algorithm in order to improve the output current quality with respect to the related standard requirements.

Figure 18A:
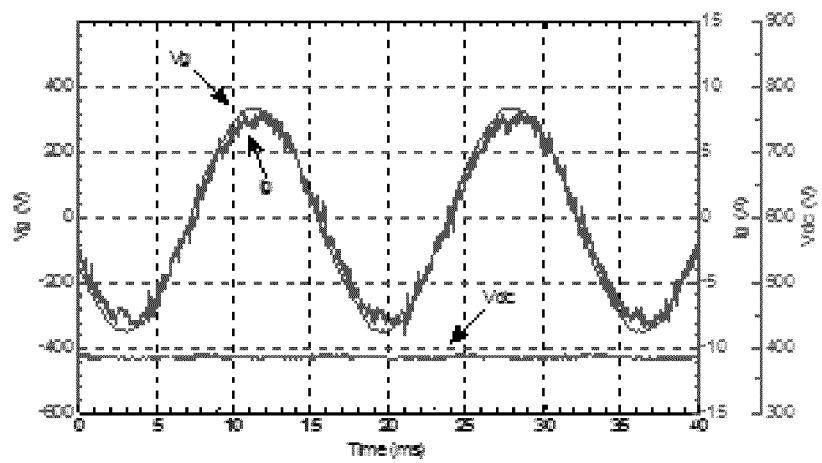
FIG. 18A depicts converter output current of a current control algorithm.
Figure 18B:
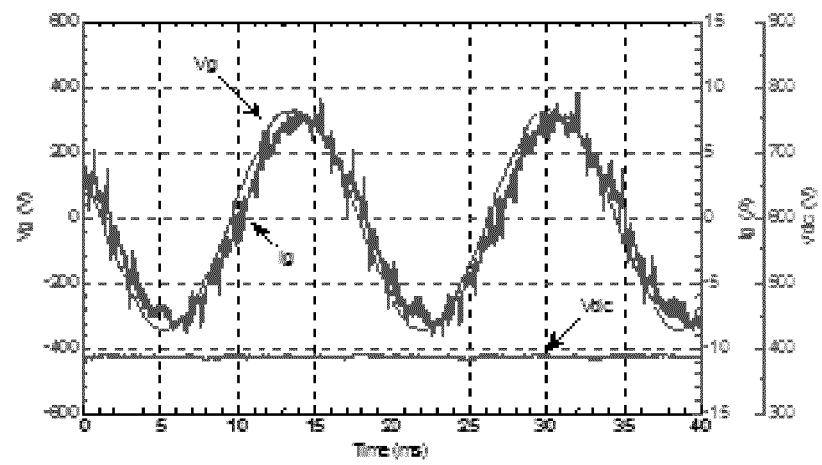
FIG. 18B depicts converter output current of a traditional current control algorithm.

The applied current control algorithm is a digital signal processor (DSP) based digital control with improved performance for single-phase grid-connected inverters. This improved current control algorithm may use the direct digital design approach, by which the system is first discretized and modeled in digital and the controller is then synthesized with the digital model. The new current control algorithm also deploys a disturbance decoupling technique to eliminate influence of the variation of the grid voltage by feeding forward the grid voltage signal to the controller. Furthermore, it introduces an additional digital compensator to deal with impacts from the inevitable control delay in the system. The converter output current of the current control algorithm is depicted in FIG. 18A. The converter output current of a traditional current control is depicted in FIG. 18B. The improvement in the quality of the output current is evident from the comparison of FIGS. 18A and 18B.

Fault diagnosis technologies for power converters can greatly improve the long-term system reliability and safety, and ease the system repair and maintenance as well. The power converter described above may include fault diagnosis algorithms for detecting possible over-current and degradation faults in the power converter. The algorithms use a small number of sensors in contrast to other algorithms, and therefore are well suited for the cost-sensitive low and medium size power converters in distribution generation applications. The algorithms described further below are based on the adaptive neuro-fuzzy inference system (ANFIS), which contributes to the robustness and effectiveness of the fault detection in a power generation system including a turbine as described above.

Conventional fault protection and diagnosis techniques are usually designed on the basis of fixed conventional relay settings, which rely on the accurate mathematical models. However, due to the uncertainty of the system and various fault conditions, the power converter model cannot be well-defined. Therefore the conventional methods cannot work well in such situations. Alternatively, the ANFIS algorithm, which combines the fuzzy inference system (FIS) and the artificial neural network (ANN), can model qualitative aspects of human knowledge and restoring process without employing quantitative analysis. Thus, this approach is very suited for the fault diagnosis for power converters.

FIS is applied to model the system whose rule structure is essentially predetermined by the user's interpretation of the characteristics of the variable in the model. Instead of using a fixed membership function chosen by the user, it uses an adaptive membership function whose parameters are trained and tuned by the neuro-adaptive learning process during the converter operation. The computation of these parameters (or their adjustment) is facilitated by a gradient vector. This gradient vector provides a measure of how well the FIS is modeling the input/output data for a given set of parameters. When the gradient vector is obtained, any of several optimization routines can be applied in order to adjust the parameter to reduce error measures. This error measure is defined by the sum of the squared difference between actual and desired outputs.

Figure 19:
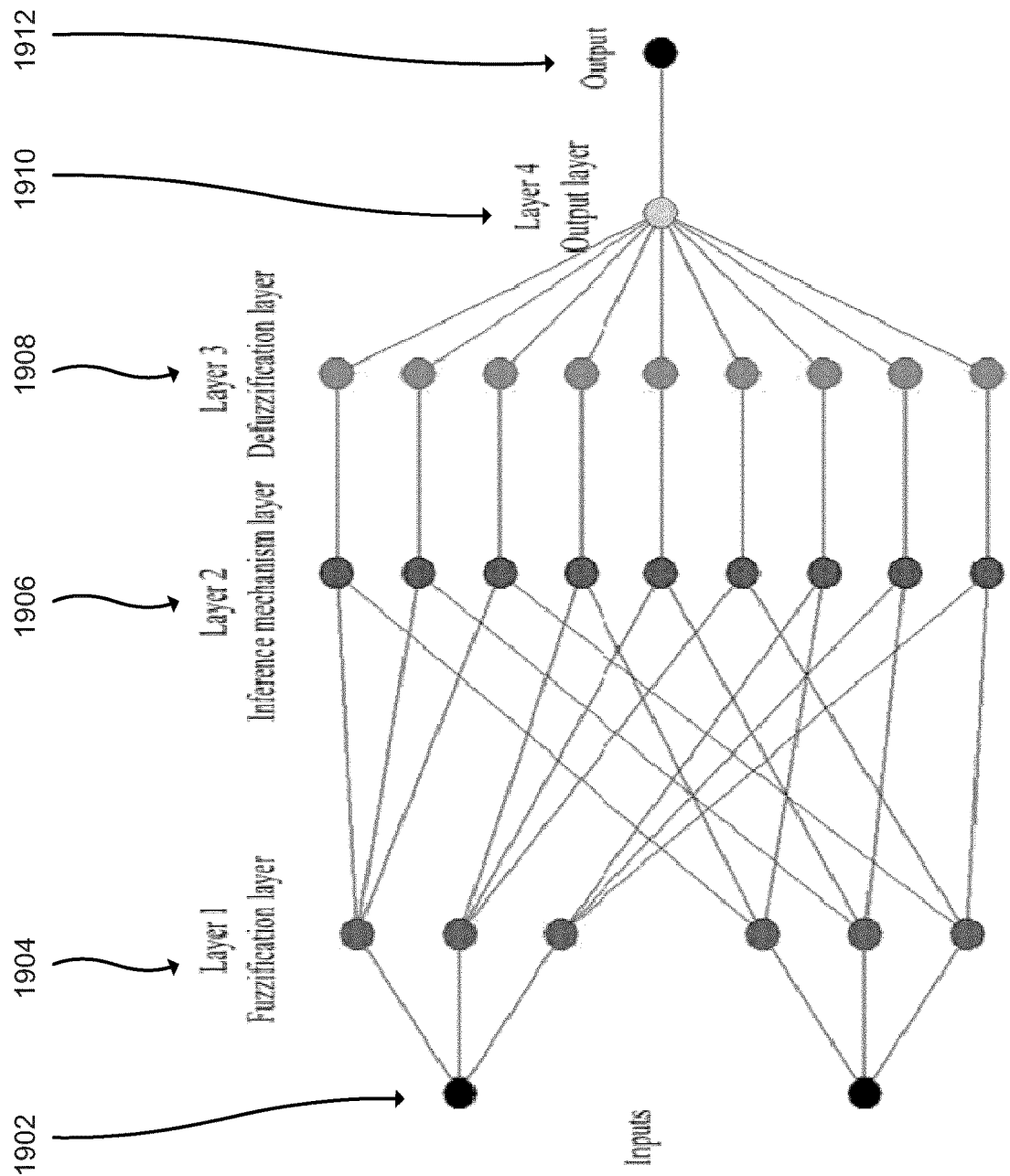
FIG. 19 depicts an ANFIS network architecture.

FIG. 19 depicts an ANFIS network architecture. The ANFIS network comprises an input layer 1902, a fuzzification layer 1904, an inference mechanism layer 1906, a defuzzification layer 1908 and an output layer. The network can be visualized as consisting of inputs, N inputs and M input membership functions for each input, with F=M*N neurons in the fuzzification layer. There are R=MN rules and R neurons in the inference mechanism and defuzzification layers respectively. Finally, there is one neuron in the output layer.

For simplicity, it is assumed that in FIG. 19 the fuzzy inference system has two inputs x and y with three input membership functions for each input and one output z. Therefore, N=2, M=3, and R=3²=9.

For first order Sugeno fuzzy model, two fuzzy if-then rules from the R rules are as following:

Rule1: if $x$ is $A_1$ and $y$ is $B_1$ then $f_1 = p_1 x + q_1 y + r_1$, (4)

Rule2: if $x$ is $A_2$ and $y$ is $B_2$ then $f_2 = p_2 x + q_2 y + r_2$, (5)

The symbol $O_{n,j}$ is used to denote the output of the $j^{th}$ node of layer n in the following subsections.

Every node j in the fuzzification layer is an adaptive node with a node function:

$$O_{1,j} = \mu_{Ai}(x) \text{ for } i=1, 2, 3 \text{ and } j=1, 2, 3 \quad (6)$$

$$O_{1,j} = \mu_{Bi}(y) \text{ for } i=1, 2, 3 \text{ and } j=4, 5, 6 \quad (7)$$

where i is the index for the three input membership functions for each input. x (or y) is the input to nodes j=1, 2, 3 (or 4, 5, 6), and $A_i$ (or $B_i$) i=1, 2, 3 is a linguistic label associated with these nodes. In other words, $O_{1,j}$ is the membership grade of a fuzzy set $A_i$ (or $B_i$), and it specifies the degree to which the given input x (or y) satisfies the quantifier A (or B).

The commonly used membership functions $\mu_{Ai}$ (or $\mu_{Bi}$) are the triangular, trapezoidal and Gaussian function. The triangular membership curve is a function of an input vector x, and it depends on three scalar parameters a, b, and c, and is given as:

$$\mu(x; a, b, c) = \begin{cases} 0, & x \le a \\ \frac{x-a}{b-a}, & a \le x \le b \\ \frac{c-x}{c-b}, & b \le x \le c \\ 0, & c \le x \end{cases} \quad (8)$$

The trapezoidal membership curve is a function of a vector x, and it depends on four scalar parameters a, b, c, and d, and is given as:

$$\mu(x; a, b, c, d) = \begin{cases} 0, & x \le a \\ \frac{x-a}{b-a}, & a \le x \le b \\ 1, & b \le x \le c \\ \frac{d-x}{d-c}, & c \le x \le d \\ 0, & c \le x \end{cases} \quad (9)$$

Finally, the Gaussian function depends on two parameters a and b and is given as:

$$\mu(x; a, b) = e^{\frac{-(x-a)^2}{2b^2}} \quad (10)$$

Parameters in the fuzzification layer maybe referred to as premise parameters.

Every node in the inference mechanism layer is a fixed node whose output is the product of all the incoming signals, and its output represents the firing strength of a rule where the AND operator is used as the node function in this layer:

$$O_{2,j} = w_j = \mu_{Ai}(x) \cdot \mu_{Bi}(y) \text{ for } i=1,2,3 \text{ and } j=1,2,\ldots,R. \quad (11)$$

Every node j in the defuzzification layer is an adaptive node with a node function as follows:

$$O_{3,j} = w_j \cdot f_j \text{ for } j=1,2,\ldots R, \quad (12)$$

where $w_j$ is the output of the second layer, and $f_j$ is the membership function of the output. There are two types of output membership functions in the ANFIS toolbox provided in the MATLAB program used in modeling the ANFIS functionality as follows.

Linear membership fuction: $f_j = p_j x + q_j y + r_j$. (13)

Constant membership fuction: $f_j = r_j$. (14)

where $p_j$, $q_j$, and $r_j$ are the coefficients of the output equations. Parameters in this layer will be referred to as consequent parameters.

The single node in the output layer is a fixed node, which computes the overall output as the summation of all incoming signals as follows:

$$O_{4,j} = \frac{\sum_{j=1}^{R} w_j f_j}{\sum_{j=1}^{R} w_j}. \quad (15)$$

From the ANFIS architecture, it is observed that when the values of the premise parameters are fixed, the overall output can be expressed as a linear combination of the consequent parameters. In symbols, the final output layer can be rewritten as:

$$z = \quad (16)$$

$$overall output = \frac{\sum_{j=1}^{R} w_j f_j}{\sum_{j=1}^{R} w_j} = \frac{w_1}{\sum_{j=1}^{R} w_j} f_1 + \frac{w_2}{\sum_{j=1}^{R} w_j} f_2 + \ldots + \frac{w_R}{\sum_{j=1}^{R} w_j} f_R,$$

as $w_1, w_2, \ldots$, and $w_R$ are assumed to be constant. Therefore, (16) is considered to be linear in the consequent parameters $f_1, f_2, \ldots$, and $f_R$. From this observation, it can be concluded that:

$$S = S_1 \hat{+} S_2, \quad (17)$$

where $\hat{+}$ represents direct sum, and S, $S_1$, and $S_2$ are as following:
S=set of total parameters;
S1=set of premise (nonlinear) parameters; e.g. a, b, c, and d parameters of the input membership functions $\mu$.
S2=set of consequent (linear) parameters; e.g. p, q and r parameters of the output membership functions f.
Therefore the overall output will be:

$$z = F(j, S), \quad (18)$$

where j is the vector of input variables, F is the overall function implemented by the adaptive network, and S is the set of all parameters which can be divided into two sets. Consequently, the hybrid-learning algorithm can be applied in two reversed passes. In the forward pass, node outputs go forward until the defuzzification layer, and the consequent parameters are updated by the least-squares method. In the backward pass, the error signals propagate backward, and the premise parameters are updated by gradient descent. Table 3 summarizes the activities in each of the forward and backward pass.

TABLE 3

Activities in forward and backward passes

| Parameters and signals | Forward pass | Backward pass |
| --- | --- | --- |
| Premise parameters | Fixed | Gradient descent |
| Consequent parameters | Least-squares estimator | Fixed |
| Signals | Node outputs | Error signals |

Figure 20:
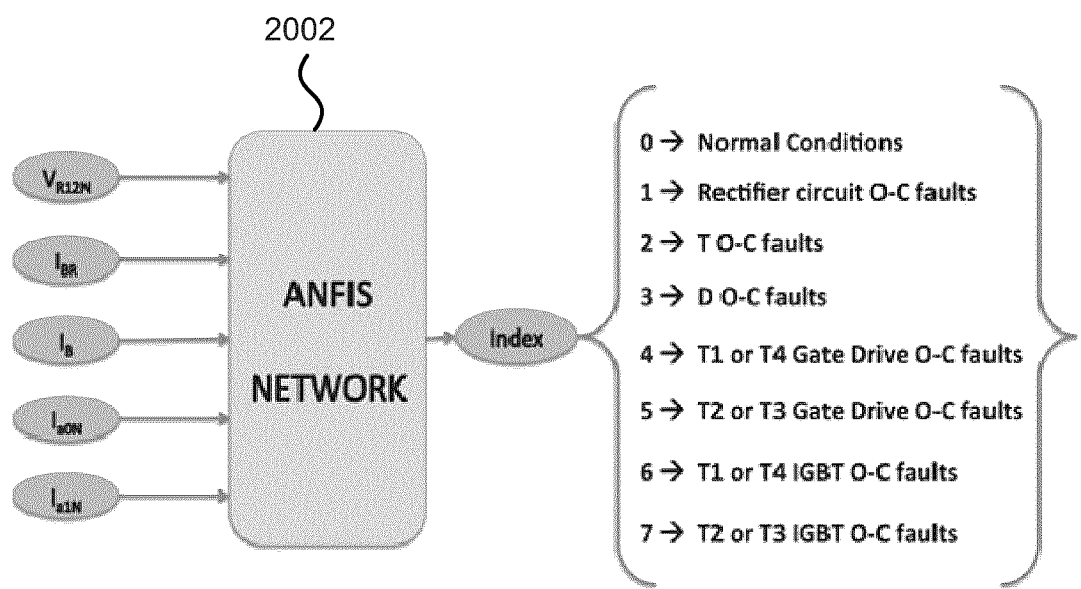
FIG. 20 shows the ANFIS-based fault diagnostic algorithms for detecting over-current faults.

FIG. 20 shows the ANFIS-based fault diagnostic algorithms for detecting the over-current (O-C) fault. As depicted in FIG. 20 and ANFIS network as described above with regard to FIG. 19 may be used to detect O-C faults based on a number of inputs. Based on the inputs, the ANFIS network provides an output value which may be used as an index of possible faults or conditions.

An ANFIS diagnostic unit 2002 is used to detect, classify, and locate the O-C faults of the power converter in its three main circuits; three-phase rectifier, boost chopper and single-phase inverter circuits.

A decision-making unit for the O-C fault diagnosis of the grid-connected power converters is developed by ANFIS algorithm in this chapter. The ANFIS diagnostic unit is used to detect, classify, and locate the O-C faults of the power converter in its three main circuits; three-phase rectifier, boost chopper and single-phase inverter circuits. As depicted, there are five inputs to the ANFIS diagnostic unit, which are given in Table 4. Further, there is one output for the proposed ANFIS unit, which is utilized as an index for detecting, classifying, and locating the O-C faults in the power converter according to its value, as provided in Table 5.

TABLE 4

Inputs

| Input No. | Identification |
|---|---|
| Input 1 | The summation of the normalized components of the first and second harmonic orders of $V_R$, i.e ($V_{R12N} = V_{R1N} + V_{R2N}$) |
| Input 2 | The difference of the average values of the input and out current of the boost chopper circuit, i.e ($I_{BR} = I_{RAVG} - I_{BAVG}$) |
| Input 3 | The output current of the boost chopper circuit, i.e ($I_B$) |
| Input 4 | The normalized average value of the output current of the inverter circuit, i.e ($I_{aoN}$) |
| Input 5 | The normalized component of the first harmonic order of the inverter circuit, i.e ($I_{a1N}$) |

TABLE 5

Outputs

| Output Index | Identification |
|---|---|
| 0 | Normal conditions |
| 1 | O-C fault conditions in the rectifier circuit |
| 2 | T O-C fault conditions |
| 3 | D O-C fault conditions |
| 4 | T1 or T4 Gate Drive O-C fault conditions |
| 5 | T2 or T3 Gate Drive O-c fault conditions |
| 6 | T1 or T4 IGBT O-C fault conditions |
| 7 | T2 or T3 IGBT O-C fault conditions |

The fault conditions are carried out at the O-C fault conditions of the three main circuits of the power converter as follows:

Rectifier O-C fault classes;

Boost chopper O-C faults at T and D switches;

Gate Drive O-C faults for the four switches in the inverter circuit;

IGBT O-C faults for the four switches in the inverter circuit.

In developing the ANFIS detection unit 2002, data sets may established in MATLAB/Simulink, or using other techniques, in order to train and test the proposed ANFIS diagnostic unit at the normal and the fault conditions from input frequency of, for example, 20 Hz to 80 Hz in steps of 1 Hz. In such an example, there are a total of 793 data pairs created in order to train and test the proposed ANFIS-fault diagnostic unit. 80% of the data sets are selected randomly and used to train the proposed ANFIS network. On the other hand, the 20% reminder is utilized in testing and verifying the performance of the ANFIS network.

Four membership functions are selected for each of the five inputs. The types of the input membership functions are chosen to be either triangular, trapezoidal, or Gaussian functions. Similarly, the types of the output membership functions are selected to be either constant or linear functions. Different combinations of the input and output membership function are implemented in order to determine which combination could achieve the least training error between the output of the training data pairs and their required targets. Table 6 provides the training error for each possible combination of the input and output membership functions.

As demonstrated in Table 6, the input Gaussian membership function and the output linear membership function is the best selection for the proposed ANFIS-fault diagnostic unit with the minimum training error 1.08%.

TABLE 6

Errors for different membership functions

| Membership function (mf) | Output constant mf | Output linear mf |
|---|---|---|
| Input triangular mf | 9.26% | 2.11% |
| Input trapezoidal mf | 28.02% | 3.24% |
| Input Gaussian mf | 10.13% | 1.08% |

In order to verify the validity of the proposed trained ANFIS system, 20% of the established data sets are used to test the ANFIS network.

Moreover, the testing data includes a white Gaussian noise of signal-to-noise ratio (SNR) of 30 dB and 20 dB in order to represent the non-ideal operating conditions of the power converter, as well as the measurements errors due to the converter sensors and the interference of the signals inside the converter. SNR can be calculated as shown in (19), where $A_S$ and $A_N$ are the signal and noise amplitudes respectively:

$$SNR = 20\log_{10}\frac{A_S}{A_N}. \qquad (19)$$

Furthermore, it was found that the proposed ANFIS unit provides false diagnostic decisions when a pulse noise is introduced to the testing data with 30% of the input signal amplitudes where this noise is not including in the training data.

Table 7 provides the maximum absolute errors (MAE) between the ANFIS targets ($ANFIS_T$) and outputs ($ANFIS_O$) for the testing situations at the normal and fault conditions. Thus, $$MAE = |ANFIS_T - ANFIS_O| \qquad (20)$$

The percentage maximum error is provided in the last column of Table 7 and it is calculated as follows:

$$\% E = \frac{MAE}{ANFIS_T} * 100\% \qquad (21)$$

TABLE 7

Maximum absolute errors for normal and fault conditions.

| Target Index | Identification | MAE | % E |
|---|---|---|---|
| 0 | Normal conditions | 0.06 | NA[*] |
| 1 | O-C fault conditions in the rectifier circuit | 0.12 | 12% |

TABLE 7-continued

Maximum absolute errors for normal and fault conditions.

| Target Index | Identification | MAE | % E |
|---|---|---|---|
| 2 | T O-C fault conditions | 0.09 | 4.5% |
| 3 | D O-C fault conditions | 0.1 | 3.33% |
| 4 | T1 or T4 Gate Drive O-C fault conditions | 0.05 | 1.25% |
| 5 | T2 or T3 Gate Drive O-c fault conditions | 0.06 | 1.2% |
| 6 | T1 or T4 IGBT O-C fault conditions | 0.075 | 1.25% |
| 7 | T2 or T3 IGBT O-C fault conditions | 0.25 | 3.5% |

(*)NA: Non-Applicable because ANFIS$_T$ equal to zero at normal conditions.

Figure 21:
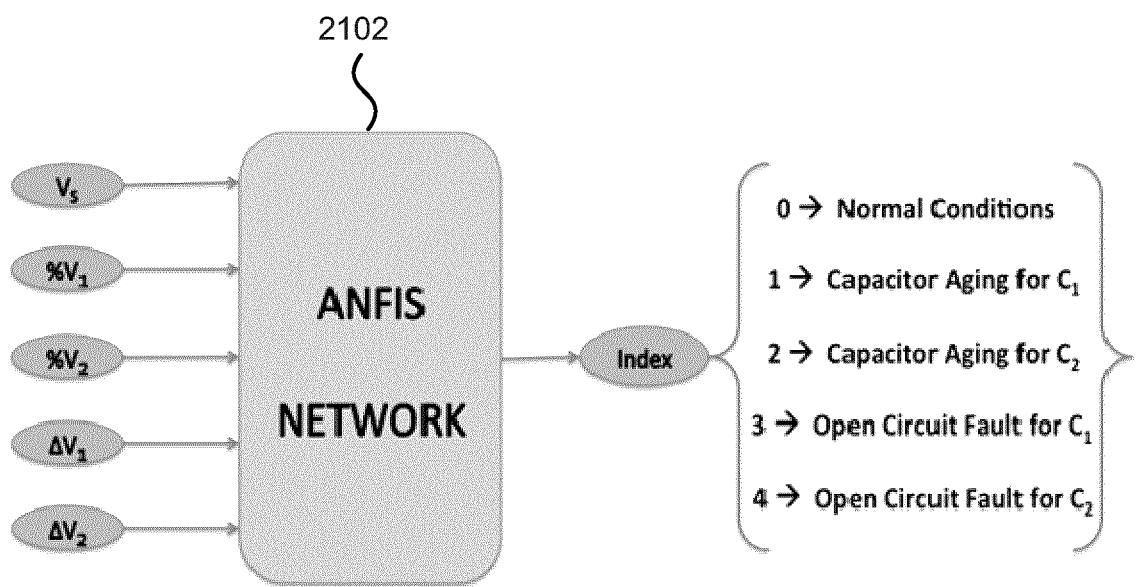
FIG. 21 shows the ANFIS-based fault diagnostic algorithms for detecting capacitor faults.

FIG. 21 shows the ANFIS-based fault diagnostic algorithms for detecting capacitor faults. The DC capacitor banks in the power converter have a relatively short lifetime compared to power semiconductor devices. DC capacitor bank failures can be divided into total breakdowns, capacitor aging and open circuit faults. In the case of a total breakdown, the converter usually shuts down because of an insufficient smoothing effect in the DC link. In the other two cases, certain limits should be defined, and a preventive maintenance is necessary to avoid further growing of their effects and subsequent total breakdown.

Capacitor aging occurs with the evaporation of electrolyte over time. Aging results in increased current ripple and increased temperature within the capacitor. In a simple equivalent model, the aging mechanism causes an increase in the equivalent series resistance (ESR) and a decrease in the capacitance (C). Manufactures define the end-life limit of a capacitor as the point in time when the ESR doubles or C changes by 20% relative to its initial values. ESR is the sum of the resistance due to aluminum oxide, electrolyte, spacer, and electrodes (foil, tabbing, leads, and ohmic contacts). The electrolytic capacitor impedance Z can be represented as follows:

$$Z = ESR + j\omega ESL + \frac{1}{j\omega C} \quad (22)$$

where $\omega$ is $2\pi f$ where f is the system operating frequency, and ESL is equivalent series inductance. ESL is mainly caused by the capacitor leads, which are cut as short as possible in the practical circuit implementation. The value of the ESL is much smaller than the ESR and could be neglected. At the switching frequency of the converters, the impedance of the electrolytic capacitors is then approximately equal to ESR. As a result, ESR is very significant in representing the DC capacitor banks, as well as in determining the self-heating of the capacitor banks and, so, indirectly, their lifetimes.

Aluminum electrolytic capacitors have a liquid electrolyte characterized by material properties of conductivity and viscosity. Both conductivity and viscosity change with temperature. In the system under the study, the temperature of the environment inside the converter is relatively fixed during the operation due to the ventilation in converter, where small fans are automatically turned on when the temperature rises beyond a certain limit. As a consequence, the changes in the ESR are mostly caused due to the degradation process of the capacitor banks.

When an open circuit fault occurs in the capacitor bank, it is equivalent to disconnecting one or more capacitors from a capacitor bank. This causes a decrease in the equivalent capacitance and an increase in the ESR. However, the change occurs very rapidly in comparison with capacitor aging, and the rate of change depends on the number of open circuit capacitors.

An Adaptive Neuro Fuzzy Inference System based diagnostic algorithm is described for detecting the DC capacitor bank faults in the power converter using only the measurements of the output voltages of the capacitor banks, as well as the input voltage of the converter. The ANFIS diagnostic unit identifies the capacitor aging and the O-C faults in the capacitor banks.

It is assumed that there are two DC capacitor banks in the power converter: one at the output of the rectifier $C_1$ and the other at output of the boost chopper $C_2$. The converter may use electrolytic DC capacitors of 1000 μF/350V. The capacitors have an ESR of 200 mΩ at normal conditions. The first DC filter bank contains three parallel capacitors in series with other three paralleled capacitors. The second bank contains five paralleled capacitors in series with other five paralleled capacitors. Therefore, under normal conditions:

$$C_1=1000*3/2=1500 \text{ μF, } ESR_1=200*2/3=133.33 \text{ mΩ,} \quad (23)$$

$$C_2=1000*5/2=2500 \text{ μF, } ESR_2=200*2/5=80 \text{ mΩ,} \quad (24)$$

During the deterioration process, as well as the O-C fault in the capacitor bank, the ESR increases and the capacitance decreases. This results in increasing the ripple of the output voltage of the capacitor banks.

Since the capacitor bank $C_1$ is connected to the output of the three-phase rectifier, which is driven by a three-phase supply, the main harmonic component of the ripple of the output rectifier voltage, $V_R$, is $6f_i$ where $f_i$ is the input voltage frequency. On the other hand, the capacitor bank $C_2$ is connected to the output of the boost chopper, as well as the input of single-phase inverter. Therefore, the main harmonic component of the ripple of the output boost chopper voltage, $V_B$, is $2f_o$, where $f_o$ is the grid voltage frequency. Consequently, in order to investigate the aging processes or the O-C faults of the two-capacitor banks, a Fast Fourier Transform (FFT) is performed to estimate the $6^{th}$ harmonic component of the ripple in $V_R$, denoted by $V_1$. Similarly, the FFT is also used to estimate the $2^{nd}$ harmonic component of the ripple in $V_B$, denoted by $V_2$.

There are two main factors affecting the ripple values of the output voltage of the capacitor banks: the ripple frequency and loading condition. As the frequency of the ripple increases, the ripple amplitude of the capacitor bank output voltage decreases. This is due to the reduction of the allowable discharge time of the capacitor bank during the increase of the frequency. As the loading of the system increases, the ripple amplitude of the capacitor bank output voltage increases. This is due to the rise of the rate of the discharge of the capacitor bank during the increase of the loading current.

Figure 22:
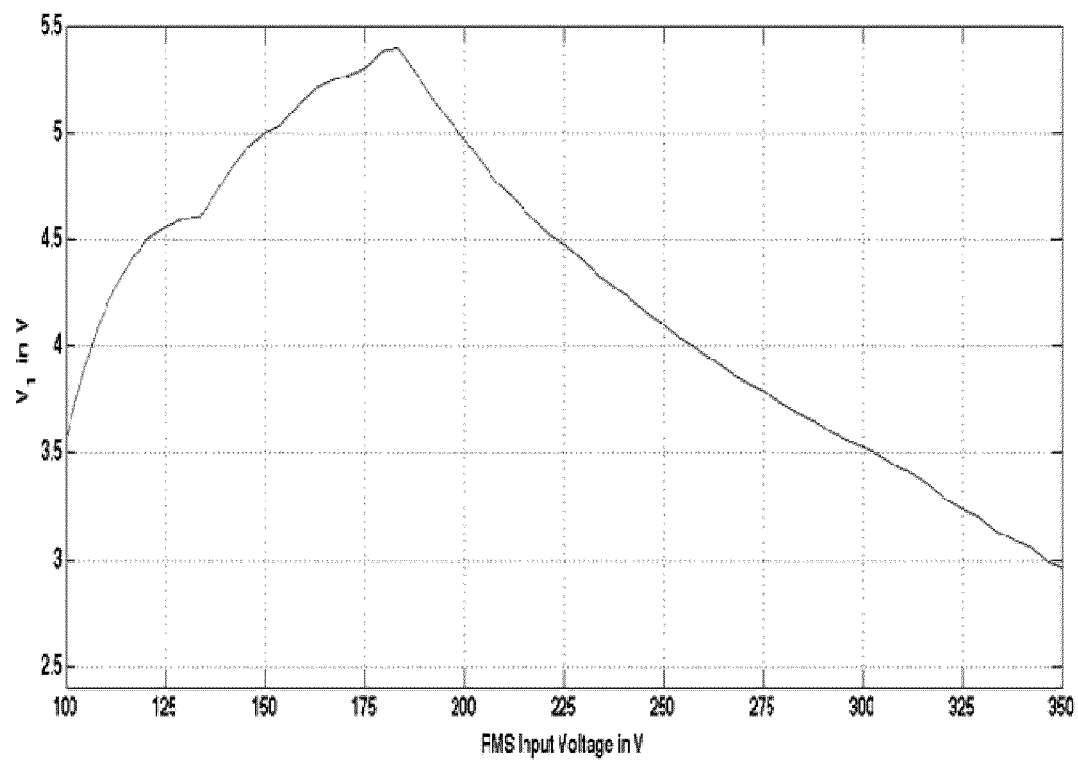
FIG. 22 depicts behavior of $V_1$ amplitude with increases in both the input frequency and loading conditions.

The loading of the converter increases with the increase of the input frequency. The behavior of the $V_1$ amplitude with the increases in both the input frequency and loading conditions is presented in FIG. 22. The figure is developed under the normal situations, where the amplitude of $V_1$ is plotted versus the input voltage $V_S$. As shown in FIG. 22 there are two distinguished regions in the $V_1$ amplitude behavior with the increases in both the input frequency and loading conditions, which have opposite influences on the amplitude. The first one is from 100 V to approximately 180 V, where $V_1$ increases with the increase of $V_S$. However, the latter one is from 180 V to 350 V where $V_1$ is decreasing with the increase of $V_S$. In the first region, the increase of the loading condition has more powerful influence on $V_1$ than that of the input frequency, so $V_1$ amplitude increases with the increase of $V_S$. On the other hand, in the second region, the increase of the input frequency has the dominant effect on $V_1$, thus $V_1$ amplitude decreases with the increase of $V_S$.

Figure 23:
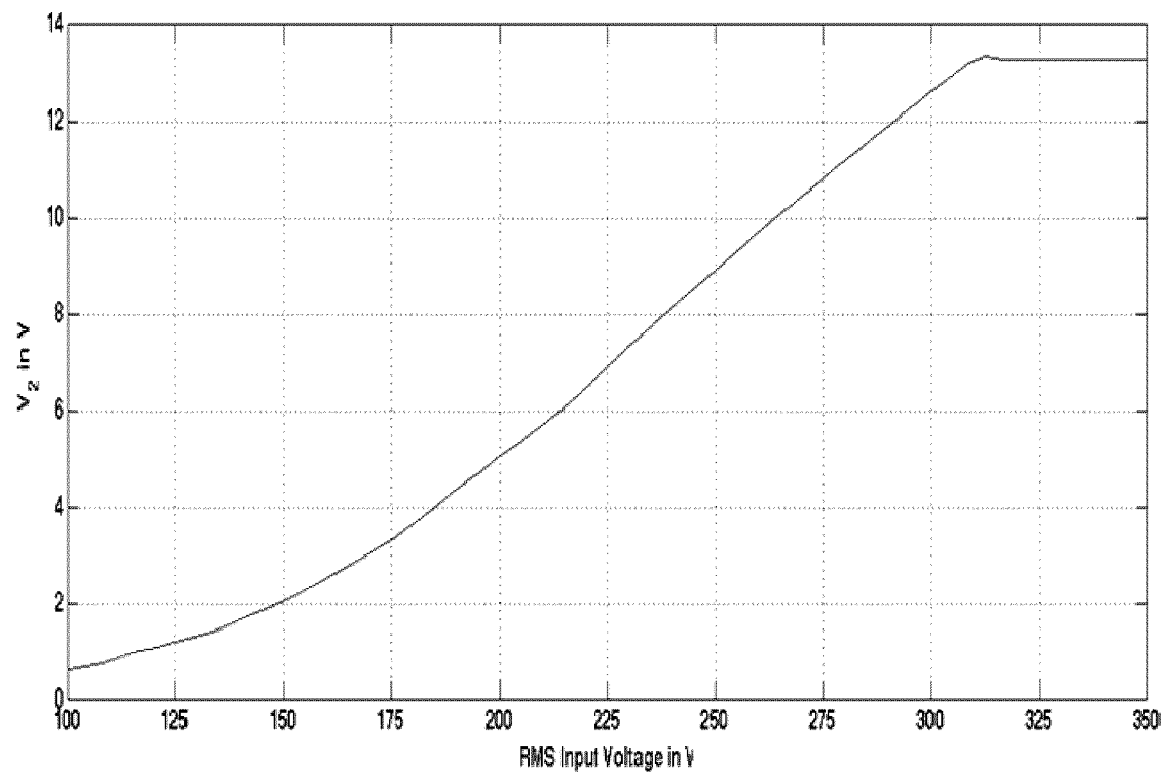
FIG. 23 depicts $V_2$ amplitude behavior versus $V_S$ for normal situations.

The ripple frequency of the output voltage of $C_2$ is directly related to the grid frequency $f_o$. Moreover, $f_o$ is fixed at 60 Hz regardless of the loading conditions. Therefore, the loading condition becomes the sole source of influence on the $V_2$ amplitude behavior. The $V_2$ amplitude behavior versus $V_S$ is given in FIG. 23 under normal situations. As shown in FIG. 23 there are two distinguished regions in the $V_2$ amplitude behavior too. The first one is form 100 V to approximately 310 V where $V_2$ increases with the loading. The latter one is from 310 V to 350 V, where $V_2$ becomes constant due to the fixed loading conditions in this region according to the MPPT algorithm implemented in this system.

In order to investigate the aging of the capacitor banks, $V_1$ and $V_2$ are calculated at the end-life states of the two-capacitor banks and they are denoted by $V_{1th}$ for capacitor bank $C_1$ and $V_{2th}$ for capacitor bank $C_2$. Therefore, the new values of $C_1$ and $ESR_1$ at the capacitor aging of the first capacitor bank become as follows:

$$C_{1ag} = m_1 C_{1n} = 0.8 C_{1n} = 0.8 \ast 150 = 1200 \ \mu F, \quad (25)$$

$$ESR_{1ag} = n_1 ESR_{1n} = 2 ESR_{1n} = 2 \ast 133.33 = 266.66 \ m\Omega, \quad (26)$$

where $C_{1ag}$ and $ESR_{1ag}$ are the series capacitance and the ESR of the first capacitor bank at the end-life aging condition respectively. On the other hand, $C_{1n}$ and $ESR_{1n}$ are the series capacitance, and the ESR of the first capacitor bank at the normal condition respectively. Finally, $n_1$ and $m_1$ are the variation ratios for $C_1$ and $ESR_1$, and they are equal to 0.8 (representing 20% decrease in C) and 2 (representing 200% increase in ESR) at the aging state respectively as mentioned previously.

Similarly, the new values of $C_2$ and $ESR_2$ at the capacitor aging of the second capacitor bank become as follows:

$$C_{2ag} = m_2 C_{2n} = 0.8 C_{2n} = 0.8 \ast 2500 = 2000 \ \mu F, \quad (27)$$

$$ESR_{2ag} = n_2 ESR_{2n} = 2 ESR_{2n} = 2 \ast 80 = 160 \ m\Omega, \quad (28)$$

where $C_{2ag}$ and $ESR_{2ag}$ are the series capacitance, and the ESR of the second capacitor bank at the aging condition respectively. On the other hand, $C_{2n}$ and $ESR_{2n}$ are the series capacitance, and the ESR of the second capacitor bank at the normal condition respectively. Finally, $n_2$ and $m_2$ are the variation ratios for $C_2$ and $ESR_2$ and they are also equal to 0.8 and 2 at the aging state respectively.

The behavior of $V_{1th}$ versus $V_S$ resembles that of FIG. 21 similarly the behavior of $V_{2th}$ versus $V_S$ resembles that of FIG. 22. Consequently, the relationship between $V_{1th}$ and $V_S$ can be linearly interpolated by using the curve fitting techniques in order to be utilized in the fault detection algorithm for the capacitor aging of $C_1$. Therefore, the relationship between $V_{1th}$ and $V_S$ may be developed in MATLAB/Simulink and can be estimated as follows:

$$\hat{V}_{1th} = \begin{cases} 0.029 \ast V_S + 2.1 & \text{for } 100 \le V_S \le 180 \\ -0.016 \ast V_S + 9.9 & \text{for } 180 < V_S \le 350 \end{cases} \quad (29)$$

where $\hat{V}_{1th}$ is the estimated value for $V_{1th}$ according to $V_S$. Similarly for the relationship between $V_{2th}$ and $V_S$, which is also linearly interpolated, and $V_{2th}$ can be estimated according to $V_S$ as follows:

$$\hat{V}_{2th} = \begin{cases} 0.086 \ast V_S - 10 & \text{for } 100 \le V_S \le 310 \\ 17 & \text{for } 310 < V_S \le 350 \end{cases} \quad (30)$$

where $\hat{V}_{2th}$ is the estimated value for $V_{2th}$ according to $V_S$. Finally, a percentage value of the measured $V_1$ over $\hat{V}_{1th}$ and a percentage of the measured $V_2$ over $\hat{V}_{2th}$ are evaluated as direct inputs to the proposed fault diagnosis algorithm. Thus, the percentage values can be calculated as follows:

$$\% V_1 = \frac{V_{1m}}{\hat{V}_{1th}} \ast 100\% \quad (31)$$

$$\% V_2 = \frac{V_{2m}}{\hat{V}_{2th}} \ast 100\% \quad (32)$$

where $V_{1m}$ is the measured $V_1$ value at the current situation, and $V_{2m}$ is the measured $V_2$ value at the current situation.

The significant difference between the capacitor aging and capacitor O-C fault is the rate of change of $V_1$ and $V_2$ during the two fault conditions. The rate of change of $V_1$ and $V_2$ during the capacitor aging is very low due to the slow variation of the capacitance and ESR during the aging. On the other hand, the sudden detachment of number of capacitors from the capacitor bank causes a rapid variation of the bank capacitance and ESR that leads to a faster rate of change in $V_1$ or $V_2$ during the capacitor open circuit faults. As a result, the voltage differences between two successive samples of the $V_1$ and $V_2$ are calculated, and these differences are used as direct inputs to the proposed fault diagnosis algorithm. Thus, the voltage differences are evaluated as follows:

$$\Delta V_1 = V_{1m}(k) - V_{1m}(k-1) \quad (33)$$

$$\Delta V_2 = V_{2m}(k) - V_{2m}(k-1) \quad (34)$$

where k is the sample index. The amount of the delay between the present and the previous values of $V_{1m}$ and $V_{2m}$ depends on the required time by the signal processing calculations to calculate the steady state values of the $V_{1m}$ and $V_{2m}$ during the running of the power converter within the range of the input frequency. According to the minimum input frequency, i.e. 20 Hz, it is found that 0.05 sec is sufficient to evaluate the present and the previous values of $V_{1m}$ and $V_{2m}$.

Returning to FIG. 21, a decision-making unit 2102 for the diagnoses of capacitor bank faults is developed with ANFIS algorithm. The ANFIS diagnostic unit 2102 is used to detect, classify, and locate the faults of the capacitor banks in the power converter under study.

The ANFIS decision-making network has five inputs, which are given in Table 8. It has one output whose value is used as an index in order to identify either there is normal or fault condition for the capacitor banks. Then, during the fault conditions, it classifies the faults types (either capacitor aging or O-C fault) and also locates the fault (either in $C_1$ or $C_2$) as provided in Table 9.

TABLE 8

Inputs

| Input No. | Identification |
|---|---|
| Input 1 | $V_s$; the RMS value of the input three-phase line voltage |
| Input 2 | % $V_1$; the percentage value of the measured $V_1$ over $\hat{V}_{1th}$ |
| Input 3 | % $V_2$; the percentage value of the measured $V_2$ over $\hat{V}_{2th}$ |
| Input 4 | $\Delta V_1$; the voltage difference between two successive samples of the $V_1$ |
| Input 5 | $\Delta V_2$; the voltage difference between two successive samples of the $V_2$ |

TABLE 9

Outputs

| Output Index | Identification |
|---|---|
| 0 | Normal conditions |
| 1 | Capacitor aging for $C_1$ |
| 2 | Capacitor aging for $C_2$ |
| 3 | O-C fault for $C_1$ |
| 4 | O-C fault for $C_2$ |

Data sets may be established in MATLAB/Simulink in order to train and test the proposed ANFIS diagnostic unit at the normal and the fault conditions from input frequency 20 Hz to 80 Hz in steps of 1 Hz. The fault conditions are carried out at the capacitor aging and the open circuit fault for the two-capacitor banks. There are a total of 732 data pairs created in order to train and test the proposed ANFIS-fault diagnostic unit.

The established data set pairs are carried out at various situations of normal and fault conditions where the $m_1$, $m_2$, $n_1$, and $n_2$ are chosen to represent different behaviors of the aging process of the capacitor banks as indicating in the following:

Normal conditions, where $m_1=n_1=m_2=n_2=1$.
Normal conditions, where $m_1=m_2=0.9$ and $n_1=n_2=1.5$
Capacitor aging for $C_1$, where $m_1=0.65$ and $n_1=2.75$, while $m_2=n_2=1$
Capacitor aging for $C_1$, where $m_1=0.55$ and $n_1=3.25$, while $m_2=n_2=1$
Capacitor aging for $C_2$, where $m_2=0.65$ and $n_2=2.75$, while $m_1=n_1=1$
Capacitor aging for $C_2$, where $m_2=0.55$ and $n_2=3.25$, while $m_1=n_1=1$
O-C fault for $C_1$, where one capacitor is disconnected from the bank
O-C fault for $C_1$, where two series capacitors are disconnected from the bank
O-C fault for $C_1$, where two parallel capacitors are disconnected from the bank
O-C fault for $C_2$, where one capacitor is disconnected from the bank
O-C fault for $C_2$, where two series capacitors are disconnected from the bank
O-C fault for $C_2$, where two parallel capacitors are disconnected from the bank 80% of the data sets are selected randomly and used to train the proposed ANFIS network. On the other hand, a 20% reminder is utilized in testing and verifying the performance of the ANFIS network.

Four membership functions are selected for each of the 5 inputs. The type of the input membership functions is chosen to be Gaussian membership function. On the other hand, the type of the output membership functions is selected to be linear membership function. The chosen types for the input and output membership functions achieve training error 6.9% which is the minimum among the other membership functions types.

In order to verify the validity of the proposed trained ANFIS system, 20% of the established data sets are used to test the ANFIS network. White Gaussian noise of signal-to-noise ratio (SNR) of 25 dB and 15 dB were also added to the testing data in order to represent the non-ideal operating conditions of the power converter, as well as the measurements errors due to the converter sensors and the interference of the signals inside the converter.

Table 10 provides the MAE and %E between the ANFIS outputs and targets for the previous testing situations at the normal and fault conditions. Furthermore, it was found that the proposed ANFIS unit provides false diagnostic decisions when a pulse noise is introduced to the testing data with 25% of the input signal amplitudes.

TABLE 10

Maximum absolute errors for normal and fault conditions.

| Target Index | Identification | MAE | % E |
|---|---|---|---|
| 0 | Normal conditions | 0.09 | NA[1] |
| 1 | Capacitor aging for $C_1$ | 0.025 | 2.5% |
| 2 | Capacitor aging for $C_2$ | 0.13 | 6.5% |
| 3 | O-C fault for $C_1$ | 0.14 | 4.67% |
| 4 | O-C fault for $C_2$ | 0.18 | 4.5% |

[1]NA: Non-Applicable because ANFIS$_T$ equal to zero at normal conditions

The described ANFIS fault diagnostic unit is a robust and precise fault identifier for capacitor aging and O-C faults in the capacitor banks of the power converter. Moreover, it succeeds in classifying the fault type (either capacitor aging or O-C fault) and determining the fault location (either in $C_1$ or $C_2$) according to the value of its output indices at different normal and fault conditions, as well as supplying and loading conditions. The maximum % E is 6.5% which meets the industry recommendations.

Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. An axial-flow turbine for low-head installations comprising:
    a housing having an inlet and an outlet connected together by a flow chamber having a first diameter at the inlet, a second diameter smaller than the first diameter at an inner section and a third diameter at the outlet larger than the second diameter, wherein a transition of the housing from the second diameter to the third diameter provides an outer draft tube section of the flow chamber;
    an inner draft tube at least partially supported within the outer draft tube section of the flow chamber and extending past the outlet of the housing;
    a nose cone at least partially supported by a plurality of fixed-vanes within the flow chamber upstream of an inlet of the inner draft tube; and
    a propeller turbine runner connected to the nose cone within the flow chamber, wherein water entering the housing inlet can pass through at least one of the inner draft tube and the outer draft tube section of the flow chamber.

2. The axial-flow turbine of claim 1, wherein the plurality of fixed-vanes supporting the nose cone are shaped to direct water flow to the propeller turbine runner.

3. The axial-flow turbine of claim 2, wherein the shape of the fixed-vanes are curved to generate pre-vortex rotation in the water flow.

4. The axial-flow turbine of claim 1, comprising 6 fixed vanes.

5. The axial-flow turbine of claim 1, comprising 4 fixed vanes.

6. The axial-flow turbine of claim 1, wherein the outer draft tube section and the inner draft tube are conical in shape.

7. The axial-flow turbine of claim 1, wherein the runner has 3 fixed blades.

8. The axial-flow turbine of claim 1, wherein the runner has 4 fixed blades.

9. The axial-flow turbine of claim 1, wherein the runner has 5 fixed blades.

10. The axial-flow turbine of claim 1, wherein a generator is coupled to the propeller turbine runner.

11. The axial-flow turbine of claim 10, wherein the generator is located within the nose cone.

12. The axial-flow turbine of claim 10, wherein the generator is a variable-speed permanent magnet generator.

13. The axial flow turbine of claim 12, further comprising a power converter connected to the permanent magnet generator for outputting an alternating current.

14. The axial flow turbine of claim 1, wherein an inlet to the inner draft tube is arranged downstream of the propeller turbine runner such that the water entering the housing inlet can enter the inlet to the inner draft tube after passing the propeller turbine runner.

15. An axial-flow turbine for low-head installations comprising:
a housing having an inlet and an outlet connected together by a flow chamber having a first diameter at the inlet, a second diameter smaller than the first diameter at an inner section and a third diameter at the outlet larger than the second diameter, wherein a transition of the housing from the second diameter to the third diameter provides an outer draft tube section of the flow chamber;
an inner draft tube at least partially supported within the outer draft tube section of the flow chamber;
a nose cone at least partially supported by a plurality of fixed-vanes within the flow chamber upstream of an inlet of the inner draft tube;
a propeller turbine runner connected to the nose cone within the flow chamber; and
a generator coupled to the propeller turbine runner and located within the nose cone,
wherein water entering the housing inlet can pass through at least one of the inner draft tube and the outer draft tube section of the flow chamber.

16. An axial-flow turbine for low-head installations comprising:
a housing having an inlet and an outlet connected together by a flow chamber having a first diameter at the inlet, a second diameter smaller than the first diameter at an inner section and a third diameter at the outlet larger than the second diameter, wherein a transition of the housing from the second diameter to the third diameter provides an outer draft tube section of the flow chamber;
an inner draft tube at least partially supported within the outer draft tube section of the flow chamber;
a nose cone at least partially supported by a plurality of fixed-vanes within the flow chamber upstream of an inlet of the inner draft tube; and
a propeller turbine runner connected to the nose cone within the flow chamber,
wherein water entering the housing inlet can pass through at least one of the inner draft tube and the outer draft tube section of the flow chamber, and
wherein an inlet to the inner draft tube is arranged downstream of the propeller turbine runner such that the water entering the housing inlet can enter the inlet to the inner draft tube after passing the propeller turbine runner.

* * * * *